(12) United States Patent
Battle et al.

(10) Patent No.: US 8,682,740 B2
(45) Date of Patent: Mar. 25, 2014

(54) SYSTEMS AND METHODS USING A MANUFACTURER LINE, SERIES, MODEL HIERARCHY

(75) Inventors: Robyn Battle, Dublin, CA (US); Karen A. Swanson, San Jose, CA (US); David Bricker, Corte Madera, CA (US); Tristan G. Rinehart, San Francisco, CA (US); Andy Shirey, San Francisco, CA (US); Jon Chaikin, Tiburon, CA (US)

(73) Assignee: CBS Interactive Inc., San Fancisco, CA (US)

( * ) Notice: Subject to any disclaimer, the term of this patent is extended or adjusted under 35 U.S.C. 154(b) by 184 days.

(21) Appl. No.: 12/912,464

(22) Filed: Oct. 26, 2010

(65) Prior Publication Data

US 2012/0101918 A1  Apr. 26, 2012

(51) Int. Cl.
*G06Q 30/00* (2012.01)

(52) U.S. Cl.
USPC ............... 705/26.1; 705/26.61; 705/26.62; 705/26.63; 705/26.64; 705/26.8; 705/27.1; 707/999.102

(58) Field of Classification Search
USPC ............ 705/26.1, 26.61, 26.62, 26.63, 26.64, 705/26.8, 27.1; 707/999.102
See application file for complete search history.

(56) References Cited

U.S. PATENT DOCUMENTS

| | | | |
|---|---|---|---|
| 6,034,652 A | 3/2000 | Freiberger et al. | |
| 6,263,507 B1 | 7/2001 | Ahmad et al. | |
| 6,587,836 B1 | 7/2003 | Ahlberg et al. | |
| 6,598,026 B1* | 7/2003 | Ojha et al. | 705/80 |
| 6,757,682 B1 | 6/2004 | Naimark et al. | |
| 6,788,314 B1 | 9/2004 | Freiberger et al. | |
| 6,836,797 B2 | 12/2004 | Givoly et al. | |
| 7,047,211 B1* | 5/2006 | Van Etten et al. | 705/26.8 |
| 7,840,437 B2 | 11/2010 | Lewis | |
| 8,001,145 B1* | 8/2011 | Cornali | 707/779 |
| 2002/0046131 A1* | 4/2002 | Boone et al. | 705/26 |
| 2002/0169849 A1* | 11/2002 | Schroath | 709/218 |
| 2005/0086123 A1* | 4/2005 | White | 705/26 |
| 2005/0216421 A1 | 9/2005 | Barry et al. | |
| 2006/0242192 A1* | 10/2006 | Musgrove et al. | 707/102 |
| 2008/0015953 A1 | 1/2008 | Harper et al. | |
| 2011/0208669 A1 | 8/2011 | Ruhl et al. | |

\* cited by examiner

*Primary Examiner* — Yogesh C Garg

(74) *Attorney, Agent, or Firm* — Marc S. Kaufman; Gerard M. Donovan; Reed Smith LLP

(57) ABSTRACT

A computer-implemented method and apparatus for providing navigation of a database includes a plurality of records having attributes, the method including transmitting a webpage configured to display a plurality of hierarchies of selectable filters corresponding for plural manufacturer's products, wherein each hierarchy corresponds to the respective manufacturer's product taxonomy, receiving at least one attribute value based on a filter selection, transmitting a query to an index for unique identifiers corresponding to that satisfy the at least one attribute value, receiving the unique identifiers, transmitting a query to a product data set for records in the data set corresponding to the unique identifier, receiving, with a computing device, the one or more records, and transmitting said one or more records.

18 Claims, 15 Drawing Sheets

FIG. 2

SYSTEMS AND METHODS USING A MANUFACTURER LINE, SERIES, MODEL HIERARCHY

BACKGROUND

Many websites are configured as online catalogs. These catalogs act as alternatives to traditional paper catalogs and offer enhanced navigational features when compared to their paper counterparts as well as the advantages of broad, easy distribution. Through the Internet, the market base of manufacturers and resellers may be maximized while associated overhead may potentially be drastically reduced. Well-organized electronic catalogs help consumers make good purchasing decisions by providing extensive information about products in an easy-to-navigate manner. Such catalogs allow consumers to gain information about products and to purchase products directly. Additionally, such catalogs serve as sites where companies may purchase advertising to market their products.

Electronic catalogs generally store, in a database, information about a number of products which may be, for example, electronics, housewares, apparel, video games, digital content, or any other type of item which may be depicted and/or described electronically. Each product may be described by a set of attributes that assume values. That is, each product may be associated with a price, brand, product specifications and other attributes. Some attributes may only be stored for some classes of product. For example, weight might be an attribute of laptops, but not desktop computers, while both might have a processor speed attribute.

Retailers and manufacturers may provide taxonomies for their products, including dividing their products into product lines, series, and models. Different retailers often have different levels of hierarchies in their product taxonomies. For example, the manufacturer LENOVO™ makes the IDEAPAD™ product line, the THINKPAD™ product line, and others. Within each product line, LENOVO™ makes many series of products, for example, the IDEAPAD™ line includes the "U series" and "Y series". Additionally, within each series are many models, for example within the "U series" there are the U350. model and the U460. model. Further, within each model there may be many products, for example the IDEAPAD™ U350 having an INTEL™ PENTIUM™ SU4100. processor or the IDEAPAD™ U350. having an INTEL™ PENTIUM™ SU7300. processor. Manufacturers often provide only information about individual products rather than information about models generally. This may be inconvenient for a user that would like to compare various models rather than the many products with slight variations that fall under a model.

Further, retailers and manufacturers may vary widely in the depth of their product taxonomies. For example, while the above example shows that LENOVO™ may make many products within a model, multiple models within a series, multiple series within a line, and multiple lines of products, other manufacturers may use deeper or shallower product taxonomies. For example, the manufacturer ASUS™ makes the model EEE™ PC and within that product there are many models, for example, the 1015PED-MU17. and the 1215N. Varying taxonomies create difficulties in providing an electronic catalog having product taxonomies spanning multiple suppliers of products.

Once a retailer or other content provider has provided a taxonomy for its products, it remains for the users of the catalog system to retrieve the products using the taxonomy system. One way to do this is by performing searches using filters. Filters allow the users to reduce the potentially huge numbers of products which otherwise occupy catalogs and reduce them to manageable numbers. They also allow users to focus their searches to meet their individualized needs, as well as incorporate factors such as ability to pay or brand requirements due to purchasing contracts.

Filters may be composed of product attributes and possible attribute values which a user may select to narrow the products they wish to review. Such filters constrain the allowable values of the attributes, and thereby generate a more manageable subset of the products that the user may use, manipulate, and digest. For example, AMAZON.COM™ provides filters to narrow laptops by "Brand". However, once narrowed by the general "Brand", a user is still faced with a disarray of products to review. For example, narrowing the product category "laptops" by the brand LENOVO™ on AMAZON.COM™ provides 382. products with no method to further filter the products according to the manufacturer's taxonomy. Indeed, even a full text search for a LENOVO™ U350. results in eleven products with varying specifications and prices. This may make it exceedingly difficult for a user to accurately gauge whether or not they like a series or model because of minor differences of each specific product. While sites such as AMAZON.COM™ may also provide filters to narrow products by other attributes in addition to "Brand", for example "Display Size" and "Processor Type" attributes, these narrowing attributes may span many product series or lines. Thus, narrowing by such attributes may not assist a user in comparing one product series to another or one product line to another.

BRIEF DESCRIPTION OF THE DRAWINGS

FIG. 2 is a screenshot of an exemplary webpage having a search area having manufacturers expanded to show subcategories of each manufacturer's products according to the manufacturer's taxonomy of products.

While the system and method is described herein by way of example and embodiments, those skilled in the art recognize that generating a product line, series, model hierarchy is not limited to the embodiments or drawings described. It should be understood that the drawings and description are not intended to limit embodiments to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Disclosed embodiments provide computer-implemented methods and systems for navigating a database of records having attributes. Embodiments may include a user interface ("UI") including a search area and a results area. The search area may be configured to allow a user to search or filter the records in a database according to a manufacturer's taxonomy of products represented by the records. The results area may be configured to display to a user one or more records including one or more attributes of each record and corresponding attribute values.

Figure 1:
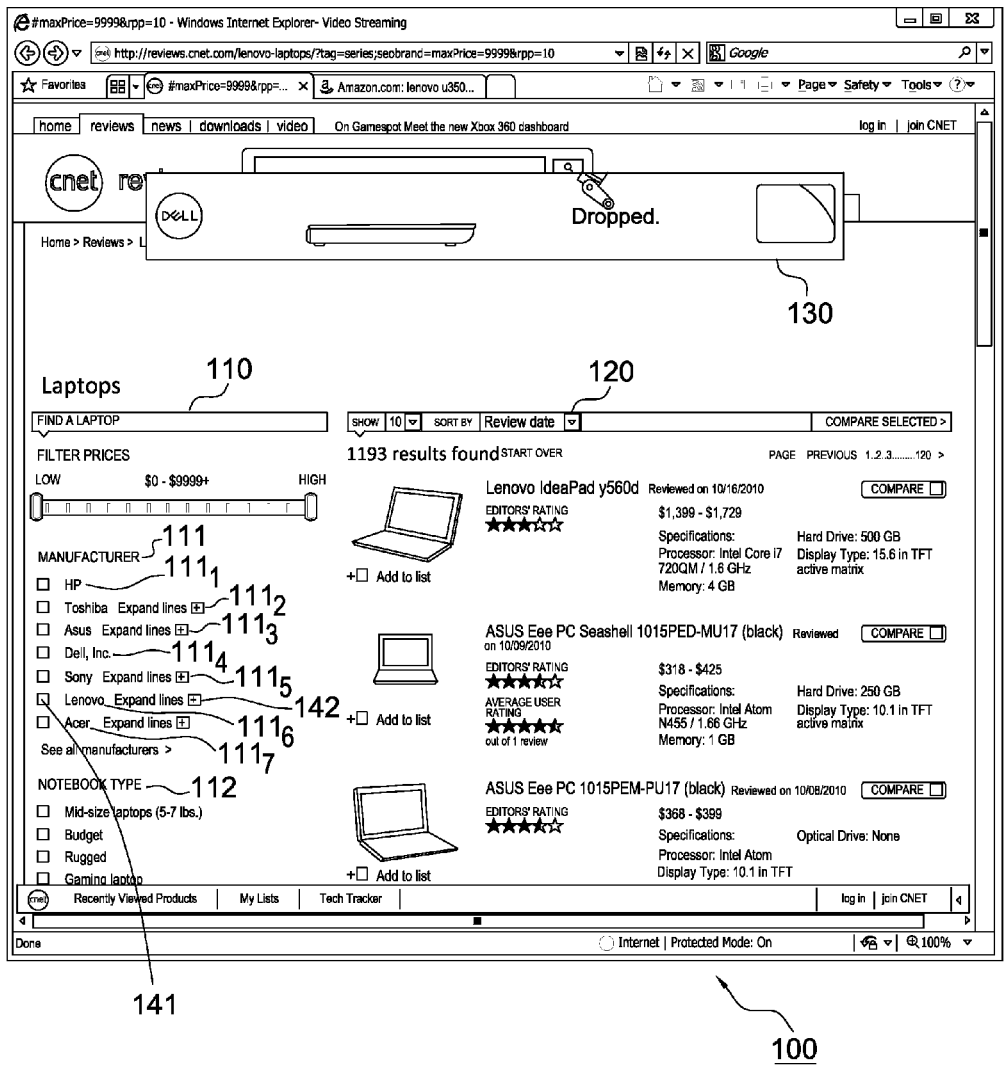
FIG. 1 is a screenshot of an exemplary webpage used as an interface for an electronic catalog.

FIG. 1 is a screenshot of an exemplary webpage 100 used as an interface for an electronic catalog. Web page 100 may be rendered in a conventional browser and viewed on a conventional display device operatively coupled to a computing device. Webpage 100 includes a search area 110 and a results area 120. For example, the electronic catalog shown in FIG. 1 includes a plurality of records corresponding to the category of laptops. Search area 110 includes one or more laptop attributes, for example manufacturer 111 and notebook type 112. Associated with each attribute may be a plurality of user selectable values of attributes. For example, associated with the attribute manufacturer 111 are values of HP™ $111_1$, TOSHIBA™ $111_2$, ASUS™ $111_3$, DELL™ $111_4$, SONY™ $111_5$, LENOVO™ $111_6$, and ACER™ $111_7$. Of course, the attributes and attribute values shown in FIG. 1 are exemplary only, and more, less, or different attributes and/or values may be chosen depending on the purpose of the catalog, for example the product type, expected users, or any other criteria. The combination of an attribute and a value/range of values/threshold value corresponds to a filter. For example, selecting the attribute manufacturer and the value APPLE™ will filter search results to show only product records representing laptops manufactured by APPLE™.

FIG. 1 shows attribute values configured to allow a user to select a value by clicking a checkbox, for example checkbox 141. Of course, other embodiments may allow a user to select a value using other UI controls, for example radio button boxes, drop down menus, hyperlinks, and the like. In some embodiments checkboxes may allow a user to select a plurality of values for a single attribute, for example a user may check HP™ $111_1$. and TOSHIBA™ $111_2$ to review laptops made by either manufacturer. In some embodiments radio button boxes may allow a system to prevent a user from selecting overlapping or mutually exclusive attribute values, for example, an attribute weight may have values selectable with radio button boxes because selection of the value such as "1. lb or less" may satisfy other selectable attribute threshold values such as "3. lb or less". Embodiments may include additional or alternative UI features to allow a user to easily interact with search area 110.

Figure 2:
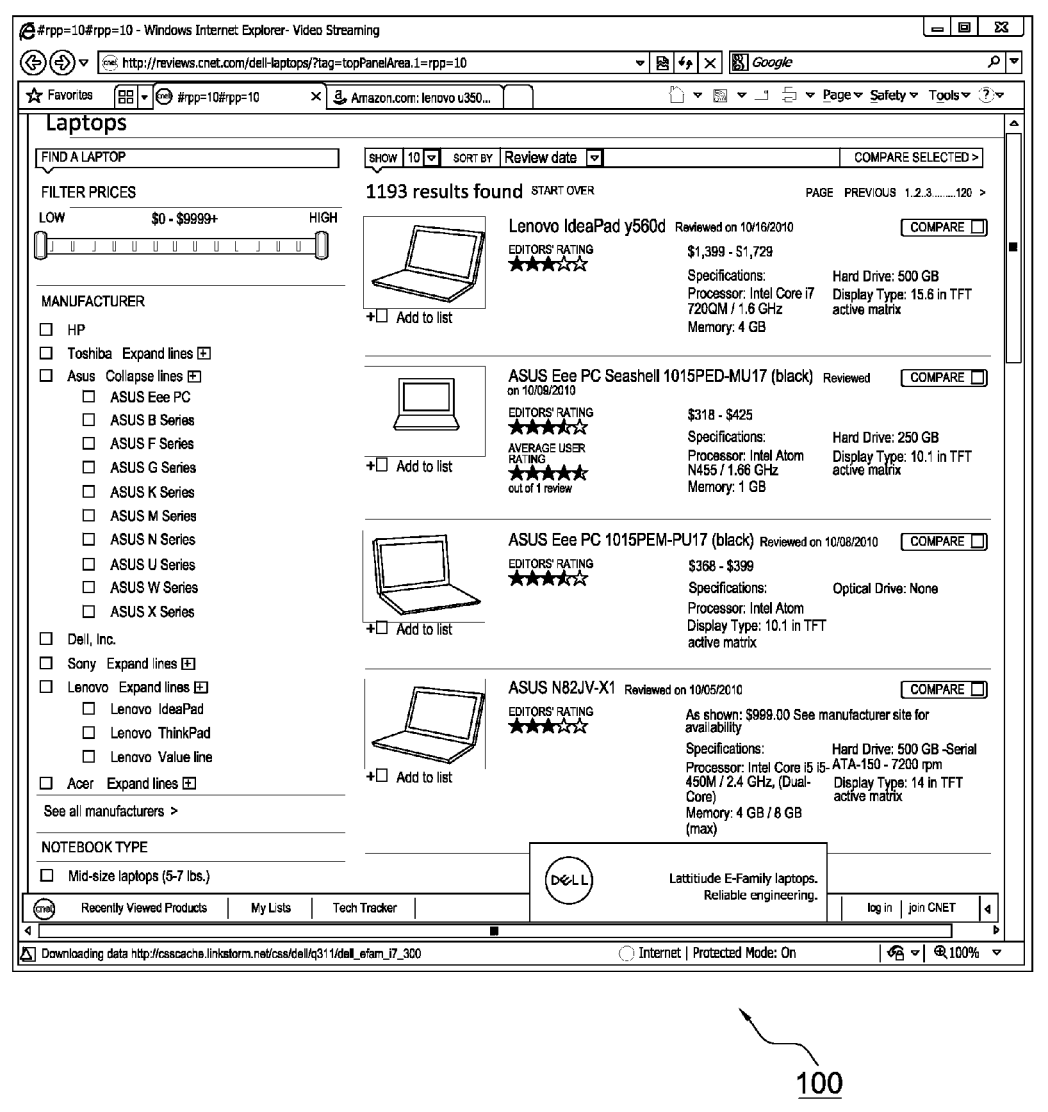

Additionally, search area 110 may allow a user to filter products according to each respective manufacturers' taxonomies of products. For example, FIG. 1 shows a plurality of expand/collapse controls (e.g., expand/collapse control 142) configured to show a sub-categorization of some manufacturers' taxonomies of products. FIG. 2 shows search area having manufacturers ASUS™ $111_3$. and LENOVO™ $111_6$. expanded to show sub-categories of each manufacturer's products according to the manufacturer's taxonomy of products. Manufactures' taxonomies may be expanded or collapsed according to conventional UI controls, for example a user may select (e.g., click) expand/collapse control 142, a user may hover a mouse over a LENOVO™ $111_6$, or any other UI control may be configured to expand or collapse manufactures' taxonomies. Of course, other embodiments may display fully expanded manufacturers' taxonomies. Thus, by selecting a user interface control, for example expand/collapse control 142, a user may further narrow products according to a manufacturer's product lines or product series.

Figure 3:
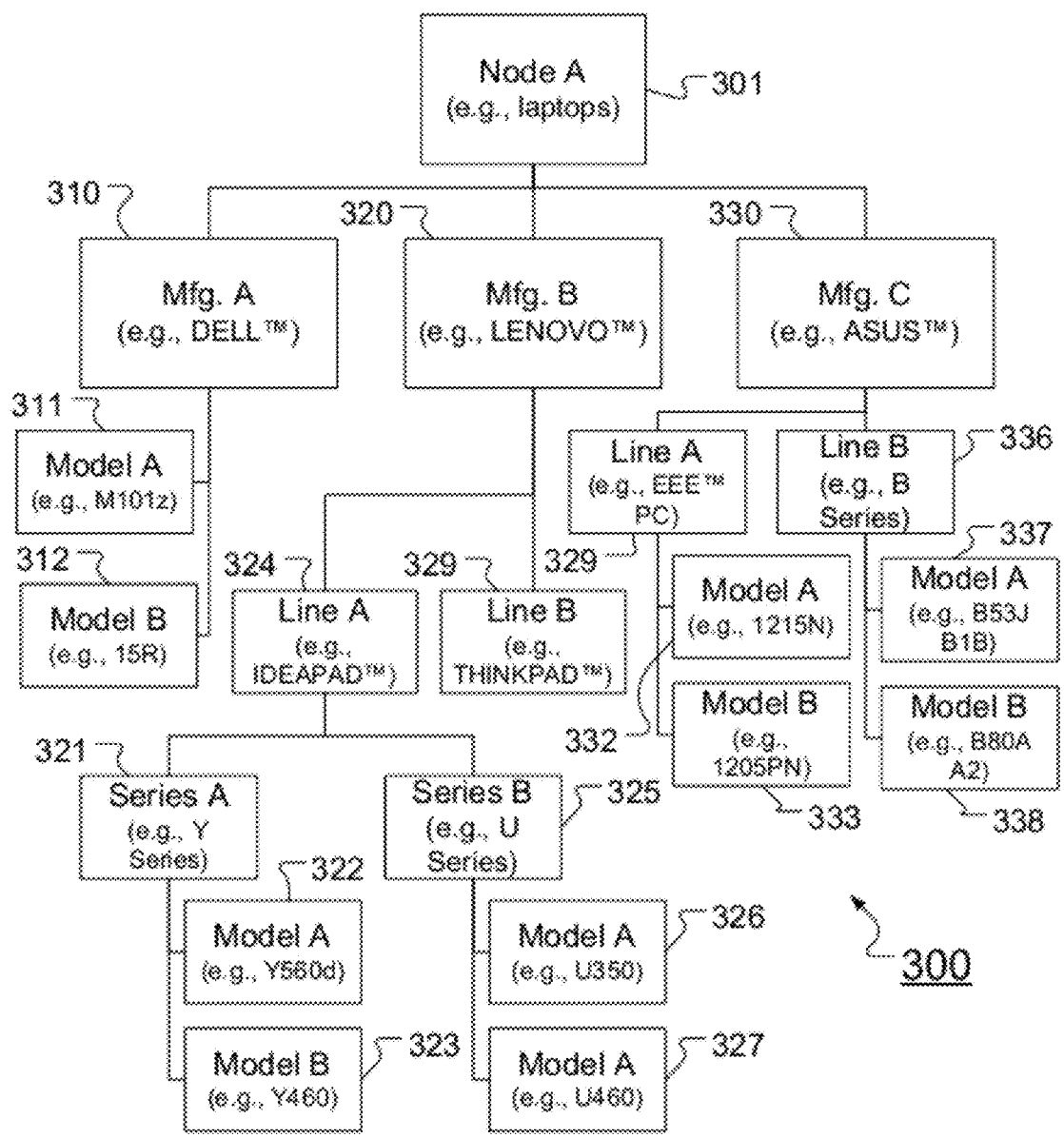
FIG. 3 is a conceptual ontology of products according to multiple manufacturers' respective product taxonomies.

Of course, various manufacturers may provide varying taxonomies for their products. Embodiments may provide a dynamic ontology useful for organizing products according to their respective manufacturer's taxonomy and allowing a user to navigate products according to that taxonomy, for example by selecting from a plurality of hierarchical filters. FIG. 3 is a conceptual ontology 300 of products according to multiple manufacturers' respective product taxonomies.

Ontology 300 may be organized under a node 301. Ontology 300 represents a logical organization of records representing products under a hierarchy. Ontology 300 may be stored on a computer memory device as a database or in any format. Thus, ontology 300 may allow for ease of navigation of records, for example selectable filters may allow a user to narrow a set of records according to any of the logical groupings of records provided by ontology 300. Node 301 may represent a sub-category of products, for example laptops or personal computers, or a category of products, such as computers, computer games, digital content, downloadable or streamable media, descriptions of services offered, etc. Additionally, multiple nodes 301 may be logically indexed and may be useful for navigating between categories and sub-categories of products on a webpage. Under each node, one or more manufacturers may be provided, for example Mfg. A 310, Mfg. B 320, and Mfg. C 330. Under each manufacturer, additional levels of logical groupings may be provided according to the respective manufacturer's own taxonomical organization of products. For example, if Mfg. A 310 simply provides individual models, Model A 311 and Model B 312 may be provided directly beneath Mfg. A 310 in ontology 300. Alternatively, manufacturers may provide various lines of products and product models within each line. For example, Mfg. C 330 may include Line A 331 and Line B 336. Within each line may be one or more models, for example within Line A 331 may be Model A 332 and Model B 333 and within Line B 336 may be Model A 337 and Model B 338.

Further, some manufacturers provide more in depth taxonomies of products having lines, series, and models of products. For example, Mfg. B 320 includes Line A 321 and Line B 329. Under a single line, such as Line A 321, may be a plurality of series, such as Series A 321 and Series B 326. Under each respective series there may be a plurality of models, for example, under Series A 321 may be Models 322 and 323 and under Series B 326 may be Models 327 and 328. While not shown in FIG. 3, each model may include a plurality of products having various specifications and configurations or other attribute values. Of course, ontology 300 may be configured dynamically and may include more or less tiers depending on various manufacturer's respective taxonomies.

An ontology may be configured to provide a logical organization of records according to each manufacturer's taxonomy by receiving direct feeds of product information from the manufacturer including attribute values indicating each product's location within the manufacturer's taxonomy. For example, ontology 300 shows that Mfg. A 310 may be DELL™ and shows that Model A 311 may be M101z and Model B 312 may be 15R. While the M101z and 15R may be considered part of the DELL™ INSPIRON™ product line, if DELL™ provides a direct feed of product information that only identifies products by a product model or by a product identification (e.g., SKU), records representing DELL™ products may be arranged in ontology 300 directly under Mfg. A 310. Alternatively, a manufacture may provide a multi-tiered taxonomy of products in a direct feed for cataloging. For example, ontology 300 shows that Mfg. B 320 may be LENOVO™ and shows that Line A 320 may be IDEAPADs™ and Line B 329 may be THINKPADs™. Line A 320 may further be divided into a plurality of series, for example Series A 321 may be "Y Series" and Series B 325 may be "U Series". Further, Series A 321 may be subdivided into models such as Model A 322 Y560d and Model B 323 Y460. and Series B 325 may be subdivided into models such as Model A 326 U350. and Model B 327 U460.. So, when LENOVO™ transmits product information to an electronic catalog for an IDEAPAD™ U350, a product record may be transmitted having a line attribute value "IDEAPAD™", a series attribute value "U Series", and a model attribute value "U350". Of course, portions of exemplary manufacturers' taxonomies shown in ontology 300 are for example only and may not be accurate or complete depictions of all of or a part of any specific manufacturer's taxonomy of products. This example is not intended to represent how DELL™ or LENOVO™ may actually transmit direct feeds of product information to electronic catalogs.

Of course, ontologies need not be limited to one-to-one or one-to-many but may be many-to-many. In other words, a model may be arranged under a plurality of series and/or lines or a series may be arranged under a plurality of lines. For example, in the automotive context, manufacturer BMW™ may have a taxonomy or products where the products are arranged by lines denoted by the general body type of a vehicle, such as the "7. series", "5. series", "3. series", etc., and may also have a line of performance models denoted as the "M series". In such a taxonomy, many models may fall under only a single product line (e.g., the "325i" model may fall only under the "3. series" product line), however, some models may fall under multiple product lines (e.g., the "M3" model may fall under both the "3. series" product line and the "M series" product line). Of course, BMW may have many individual products beneath each model, with the individual products having varying attributes values (e.g., an attribute "sunroof" may be true or false) and varying price attribute values.

Figure 4A:
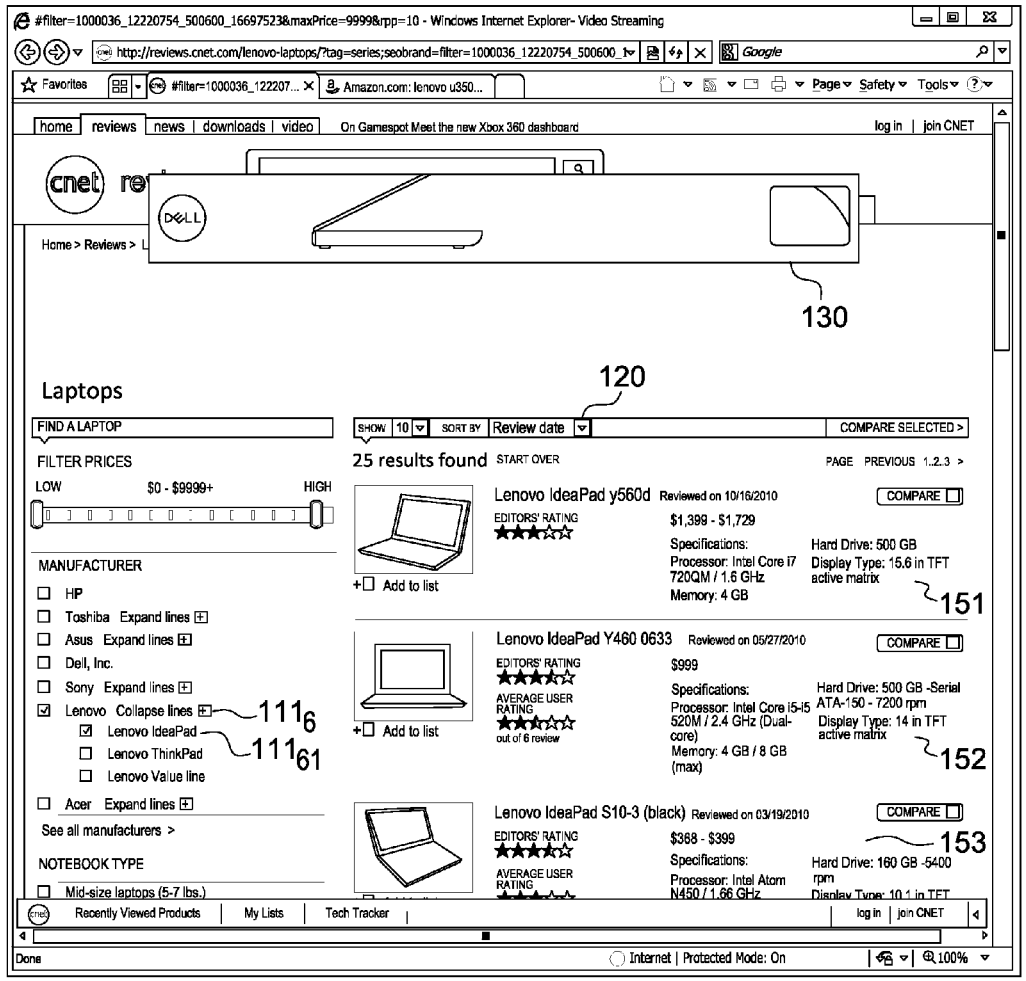
FIG. 4A is a screenshot of a webpage with a filter representing the manufacturer selected and a sub-filter representing the product line selected.

FIG. 4A shows a screenshot of webpage 100 with a filter representing the manufacturer LENOVO™ $111_6$. selected and a sub-filter representing the product line IDEAPAD™ $111_{61}$. selected. In response to a user selecting a filter or sub-filter, a database may be queried for all records corresponding to products having the attribute identified by the filter. For example, after receiving a user selection of IDEAPAD™ $111_{61}$, a database may be queried for all records in the product line IDEAPAD™ and the webpage may then receive and display one or more records associated with products in the IDEAPAD™ product line. For example, in FIG. 4A, record area 120 shows record 151 associated with an IDEAPAD™ Y560d, record 152 associated with an IDEAPAD™ Y460 0663, and record 153 associated with an IDEAPAD™ S10-3. (black). As can be seen, records displayed in response to the filter selection are all products in the IDEAPAD™ product line but span multiple product series, including the "Y Series" and "S Series".

Figure 4B:
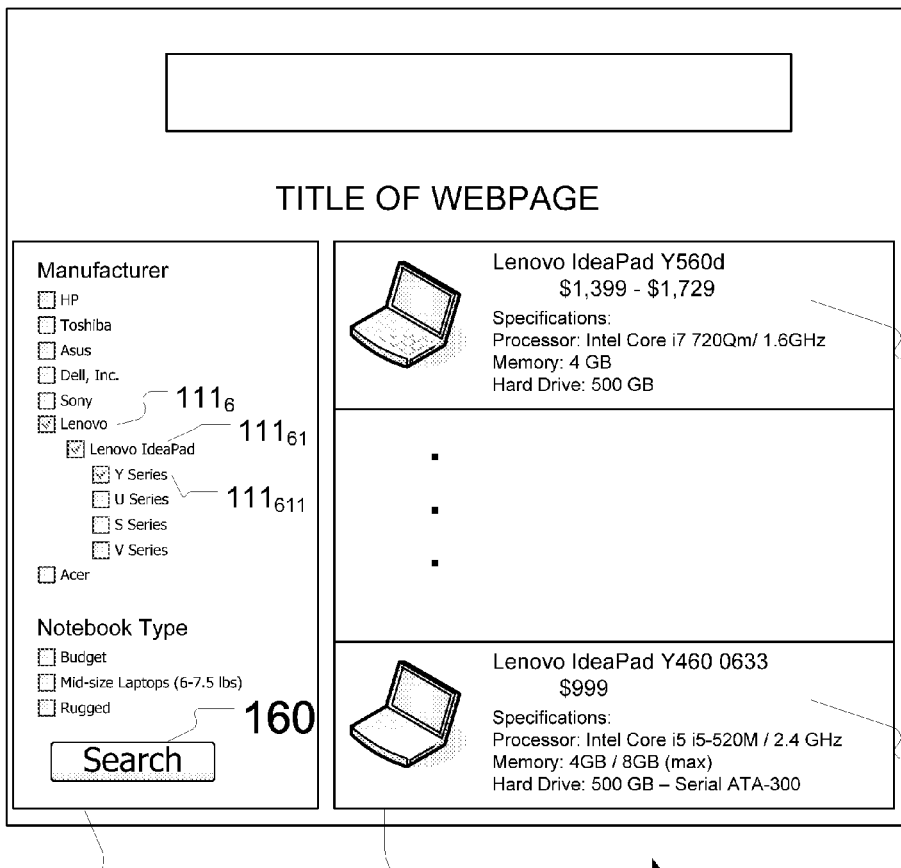
FIG. 4B shows a schematic illustration of a webpage having sub-filters associated with a plurality of product series arranged beneath the product line filter.

FIG. 4B shows a schematic illustration of webpage 100 having sub-filters associated with a plurality of product series arranged beneath the IDEAPAD™ product line filter. FIG. 4B shows that, in response to a user's selection of the filter "Y Series" $111_{611}$, a database may be queried for all records in the product series "Y Series" under the product line IDEAPAD™ and the webpage may then receive and display one or more product records associated with products in the IDEAPAD™ Y Series product series in records area 120.

FIG. 4B also includes a search control 160. Embodiments, such as those shown in FIGS. 1, 2, and 4A, may be configured to automatically query a database for records corresponding to a filter selection (e.g., a user checking or un-checking a filter) substantially immediately in response to a user's selection of a filter. Alternatively, embodiments, such as that shown in FIG. 4B, may be configured to query a database only when a user selects search control 160. Of course, other UI controls may trigger queries, for example mouse-overs, keyboard shortcuts, etc.

Embodiments may include one or more databases, for example stored as one or more software modules, having multiple logical data sets, for example a data set of meta data including filters for each manufacturer and sub-filters according to a manufacturer's product taxonomy (e.g., including product line and product series sub-filters) and a data set of product data. The meta data set may provide plural ontology nodes and filters associated with each node, for example in one or more tree structure. The product data set may include records corresponding to products, each record having attribute values related to the product. Embodiments may also have an index providing an ontology of records according to the respective manufacturer of the product corresponding to the record. For example, the index may associate a record corresponding to a product with a manufacturer, a product line, and a product series. When a user selects a filter, the database can be queried to return the attributes and values associated with the selected filter for display in a user interface (e.g., a webpage) and/or return records indicating the products corresponding to the filter selection.

Figure 5:
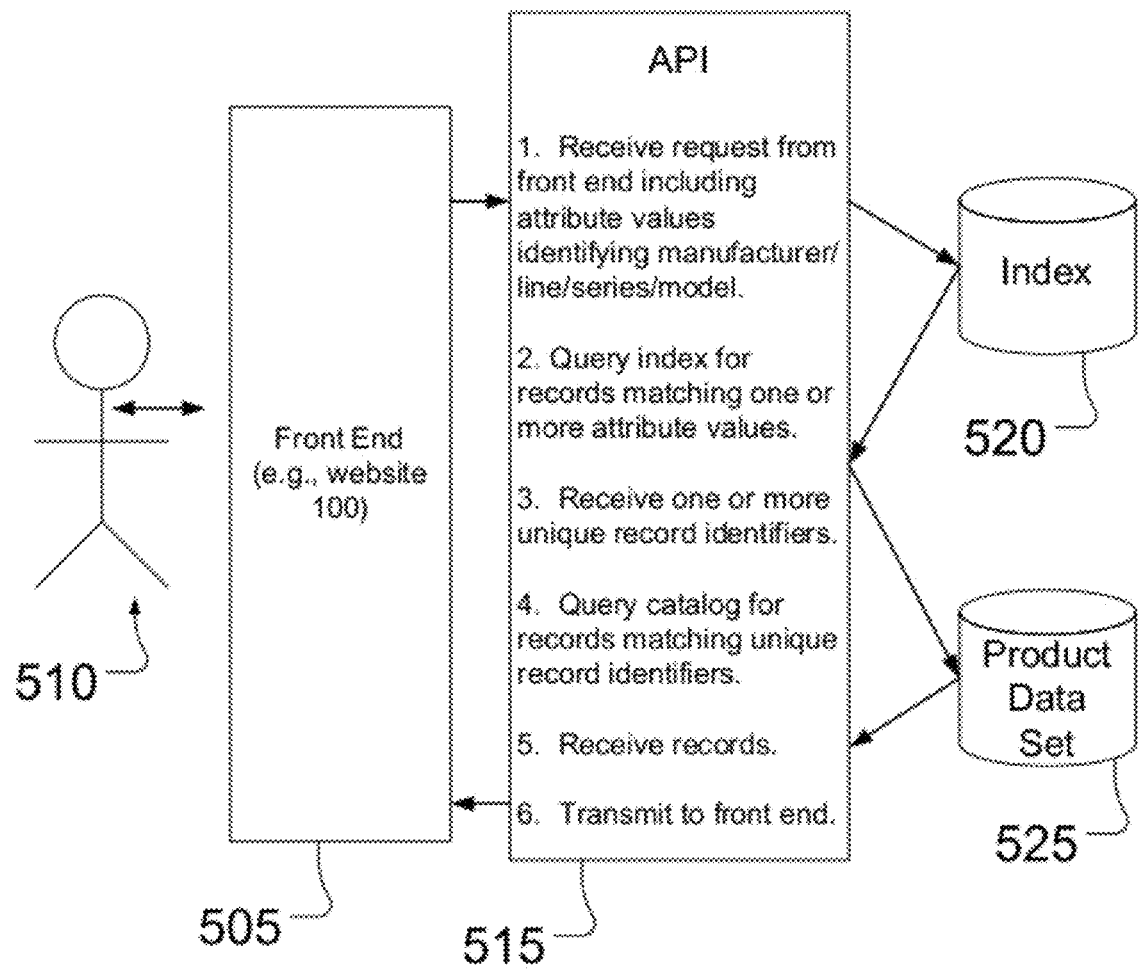
FIG. 5 is a data flow showing an exemplary process for receiving a request from a webpage for records corresponding to a manufacturer, product line, or product series and returning those records to the webpage for display.

FIG. 5 is a data flow showing an exemplary process for receiving a request from a webpage for records corresponding to a manufacturer, product line, or product series and returning those records to the webpage for display. On front end 505, a front end (e.g., software modules executed on a computing device) renders a webpage, for example webpage 100 of FIG. 1, which may include a search area and a results area. The computing device transmitting the webpage may be a hypertext transfer protocol ("HTTP") server, for example an Apache server utilizing Lucene software. The front end 505 rendering the webpage may be executed on a client computing device, for example a personal computer ("PC"), notebook PC, mobile phone (e.g., smartphone), tablet PC, set top box ("STB"), personal digital assistant ("PDA"), thin device, or any other computing device configured to receive and display a webpage. Typically, such a computing device has a browser. The front end 505 provides UI features to allow a user 510 to navigate amongst a hierarchy of filters, for example expand/collapse control 142 shown in FIG. 1. The user 510 may then select an attribute value corresponding to a product manufacturer (e.g., LENOVO™ $111_6$. shown in FIG. 1), a product line (e.g., IDEAPAD™ $111_{61}$. shown in FIG. 1), or a product series (e.g., "Y Series" $111_{611}$. shown in FIG. 4B). For example, the front end 505 may receive user input though a user input device (e.g., a mouse) indicating that the user selects (e.g., checks or un-checks) an attribute value in the search area of the webpage corresponding to a manufacturer, product line, or product series. The front end 505 then transmits one or more attribute values corresponding to the selected manufacturer, product line, or product series to an application programming interface ("API") 515. For example, webpage 100 of FIG. 1 may include instructions (e.g., HTML code, JavaScript code, asynchronous JavaScript and XML ("AJAX") code, etc.) instructing the front end 505 to automatically transmit an attribute value to API 515 when a user interacts with (e.g., selects, such as checking or un-checking) an attribute value corresponding to a selected manufacturer, product line, or product series.

API 515 may receive at least one attribute value from the front end 505 identifying one or more manufacturer, product line, product series, or product model. API 515 then transmits a query (e.g., sends an SQL query) to an index 520 (e.g., a relational database, a flat database, or any other database), such as an index having a schema corresponding to the ontology of FIG. 3, for records that correspond to the selected attribute values (i.e., records associated with products corresponding to the selected manufacturer, product line, product series and/or product model). API 515 then may receive, in response to the query, one or more unique identifiers identifying records corresponding to the selected attribute values.

After receipt of the record identifiers, API 515 may transmit a query to a product data set 520 for records corresponding to the unique identifiers. In response to the query, API 515 may receive records corresponding to the unique identifiers and then transmit the records to the front end 505 to be rendered on the webpage. The front end 505 may then receive the records corresponding to the selected filters and update the webpage to show records that have the attribute values selected by a user. For example, FIG. 4A shows that the catalog includes records of 25. LENOVO™ IDEAPAD™ laptops and displays record indicators of laptops in results area 120.

Embodiments may utilize software modules, for example Lucene software modules, executed on a computing device, to search hashes and/or bit streams in a data store, such as the index, to determine unique identifiers corresponding to records associated with a manufacturer, product line, product series, or product model and to retrieve records corresponding the unique identifiers. The index may be a table of hashes quickly searchable to retrieve unique identifiers for records corresponding to a product manufacturer, line, series, or model.

Additionally, embodiments may query a plurality of ontology nodes in a meta data set and return each filter associated with an ontology node as well as values associated with the filter in response to a user's selection of a manufacturer, product line, product series, or product model filter. For example, in response to a user selecting the EEE™ PC product line from ASUS™ in the search area of a website, an ontology node identifying the product line may be identified and the meta data set may be queried for related selectable filters (i.e., filters corresponding to attributes and associated attribute values of products in the EEE™ PC product line). A logical data set of identified selectable filters (e.g., sub-filters) may then be returned to the front end and displayed on the website (e.g., filters for display sizes of "10.1. in" and "12.1. in" may be displayed because of the EEE™ PC product line's small form factor rather than filters for display sizes "10-12. in", "12-14. in", "16-17. in", and "18. in and larger" which may be displayed for laptops generally).

Figure 6:
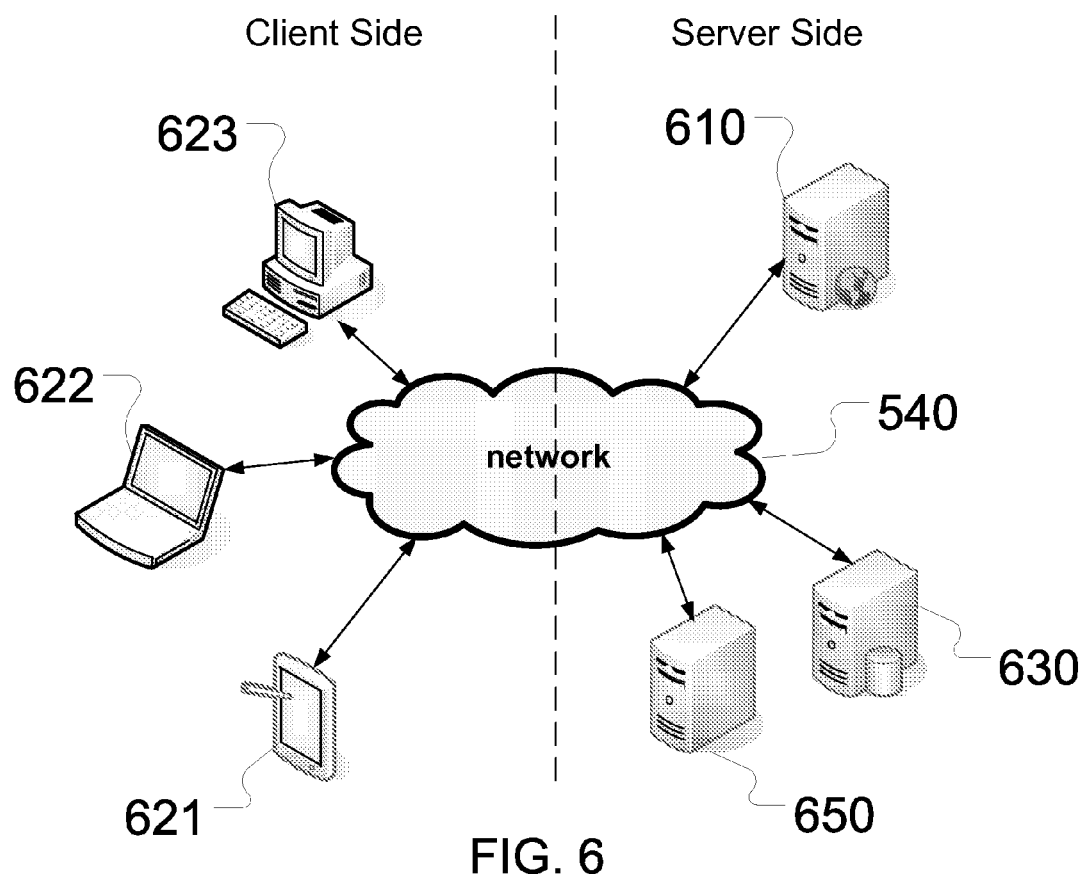
FIG. 6 shows a schematic diagram of a computing architecture useful for performing the of data flow of FIG. 5.

Of course, any number of computing devices may be involved in the process of filtering records corresponding to products by manufacturers, product lines, product series, and/or product models. For example, FIG. 5 shows a data flow indicating steps that may be performed by an API on one or more server computing devices and steps that may be performed by the front end on one or more clients computing devices. FIG. 6 shows a schematic diagram of a computing architecture useful for performing of data flow 500 of FIG. 5. Portions of data flow 500 performed by API 515 may be performed, for example, by a web server 610 and the steps performed by front end 505 may be performed, for example, by a personal computer ("PC") 623, a notebook computer 622, a personal digital assistant ("PDA") 621, or any other computing device. Web server 610 may be a single computing device or a plurality of operatively coupled (e.g., networked) computing devices, for example a server farm, a cluster, a cloud, etc. Front end 505 may receive webpage 100 from web server 610 over one or more network 640, for example the Internet, a large area network ("LAN"), a wide area network ("WAN"), or medium configured to operatively couple computing devices. Of course, any other client computing device capable of receiving a webpage may be used, for example a mobile phone, STB, thin device, tablet computer, and the like. When a user selects (e.g., checks or un-checks) a filter representing an attribute value corresponding to a manufacturer, product line, product series, or product model in an electronic catalog, instructions in the webpage may cause the client computer to send at least one attribute value to web server 610 over network 640. After receiving the one or more attribute from the client, web server 610 may send a query to a database server 630 for unique identifiers corresponding to the attribute value. Web server 610 may then receive one or more unique identifiers from database server 630 corresponding to the attribute value in response to the query. Web server 610 may then query database server 630 for records matching the returned unique identifiers and, in response, receive the records. Web server 610 may then transmit the records back to the front end on the client computing device for display in the webpage. Some of the networked computing devices may be behind a firewall, for example web server 610 and database server 630 may both be behind a common firewall such that web server 610 may communicate with database server 630 (i.e., database server 630 is a private server) while a client computing device may not be able to directly communicate with database server 630.

Alternatively, web server 610 may send one or more of the queries to a local database (e.g., a database stored in memory on web server 610), one of the queries may be sent to a local database and one to a remote data base, or each query may be sent to a separate remote database.

Further still, a single computing device may perform all steps of data flow 500 (e.g., the computing device may host a web server, host a database, and render webpage 100 in a browser). In such an embodiment, transmitting and receiving steps may, for example, transmit and receive over a bus within a single computing device rather than over a network, such as shown in FIG. 6.

Of course, more or less computing devices may be involved in other embodiments. Additionally, one of ordinary skill in the art understands that "computing device" may mean more than one computing device (e.g., clustered servers, distributed computing devices (e.g., a cloud), or any other system). One of ordinary skill in the art understands that other combinations of operatively coupled (e.g., networked) computing devices may be useful for performing data flow 500.

Figure 7:
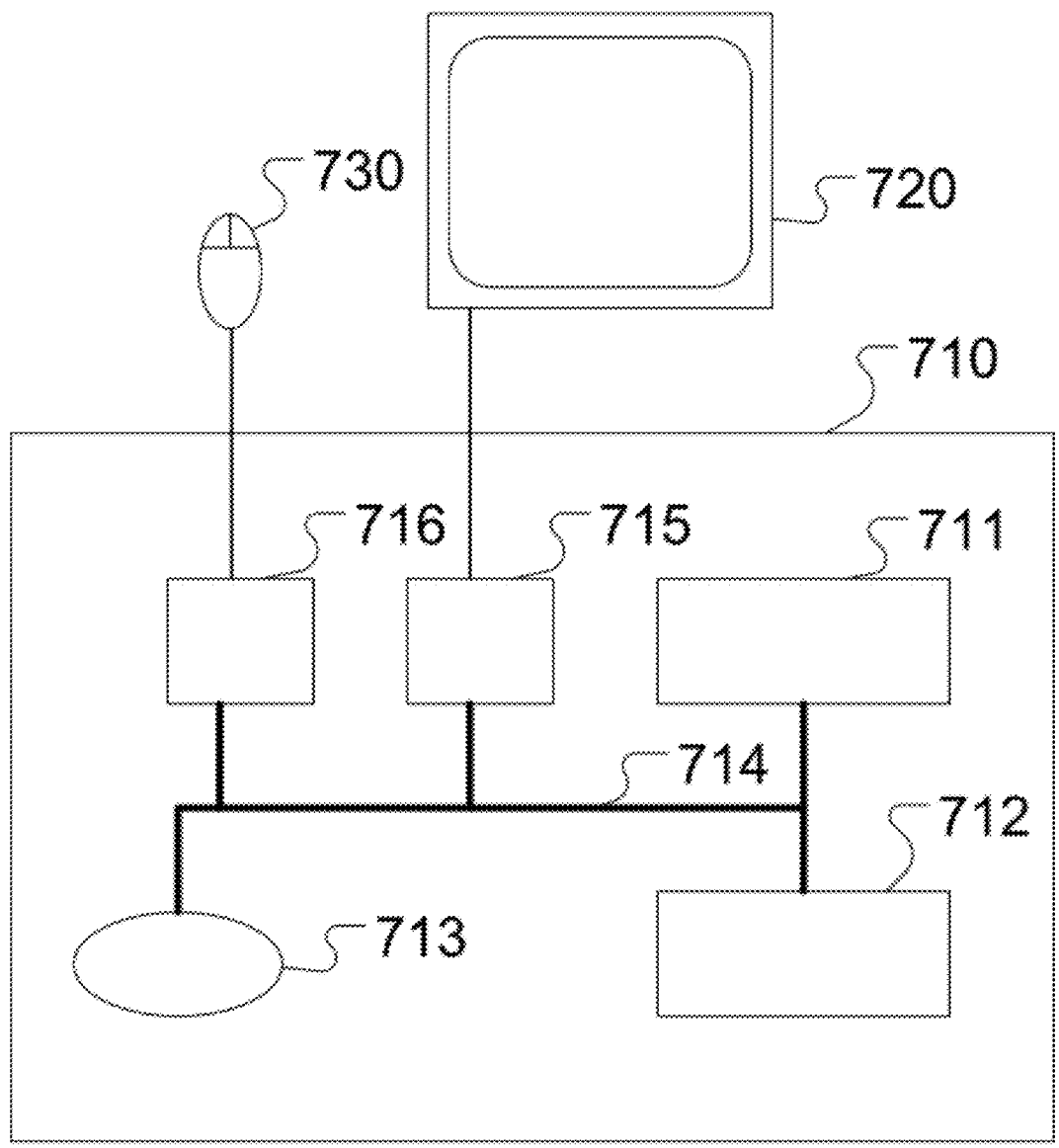
FIG. 7 shows a computing device useful for performing processes disclosed herein.

These embodiments may be implemented with software executed on hardware, for example, functional software modules executed on computing devices such as computing device 710 of FIG. 7. Embodiments may, for example, execute modules corresponding to data flow 500. Of course, steps may be performed by more than one module, a single module may perform more than one step, or any other logical division of steps of data flow 500 may be used to implement the data flow as software executed on one or more computing devices.

Computing device 710 has one or more processing device 711 designed to process instructions, for example computer readable instructions (i.e., code) stored on a storage device 713. By processing instructions, processing device 711 may perform the steps set forth in data flow 500. Storage device 713 may be any type of storage device (e.g., an optical storage device, a magnetic storage device, a solid state storage device, etc.), for example a non-transitory storage device. Alternatively, instructions may be stored in remote storage devices, for example storage devices accessed over a network or the Internet. Computing device 710 additionally has memory 712, an input controller 716, and an output controller 715. A bus 714 operatively couples components of computing device 710, including processor 711, memory 712, storage device 713, input controller 716, output controller 715, and any other devices (e.g., network controllers, sound controllers, etc.). Output controller 715 may be operatively coupled (e.g., via a wired or wireless connection) to a display device 720 (e.g., a monitor, television, mobile device screen, touch-display, etc.) in such a fashion that output controller 715 can transform the display on display device 720 (e.g., in response to modules executed). Input controller 716 may be operatively coupled (e.g., via a wired or wireless connection) to input device 730 (e.g., mouse, keyboard, touch-pad, scroll-ball, touch-display, etc.) in such a fashion that input can be received from a user (e.g., a user may select with an input device one or more manufacturer, product line, product series, or product model to filter products in an electronic catalog).

Of course, FIG. 7 illustrates computing device 710, display device 720, and input device 730 as separate devices for ease of identification only. Computing device 710, display device 720, and input device 730 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 710 may be one or more servers, for example a farm of networked servers, a clustered server environment, or a cloud network of computing devices, configured to serve web pages and/or ad content.

As described above, each manufacturer or provider of products may organize their products according to a taxonomy, and each respective taxonomy may have varying levels of hierarchy. Additionally, when an electronic catalog receives product information in a direct feed from a manufacturer, the direct feed may provide attributes corresponding to each level of the hierarchy of the manufacturer's taxonomy (e.g., LENOVO™ may provide a direct feed indicating that a product is in the IDEAPAD™ product line, "U Series" product series, and "U350" product model, as well as other attributes specific to the product (e.g., amount of memory, processor speed, etc.)) or may provide less information (e.g., LENOVO™ may provide only the product attributes, only the model and product attributes, only the line, model, and product attributes, etc.). Further, some manufacturers may not provide direct feeds of product information. For manufacturers not providing direct feeds, product information for an electronic catalog may be received from third party content providers, for example from CNET™ CONTENT SOLUTIONS ("CCS"). Third party content providers typically may provide product information including attribute values indicating both a product line and product model but typically omit a product series.

Figure 8:
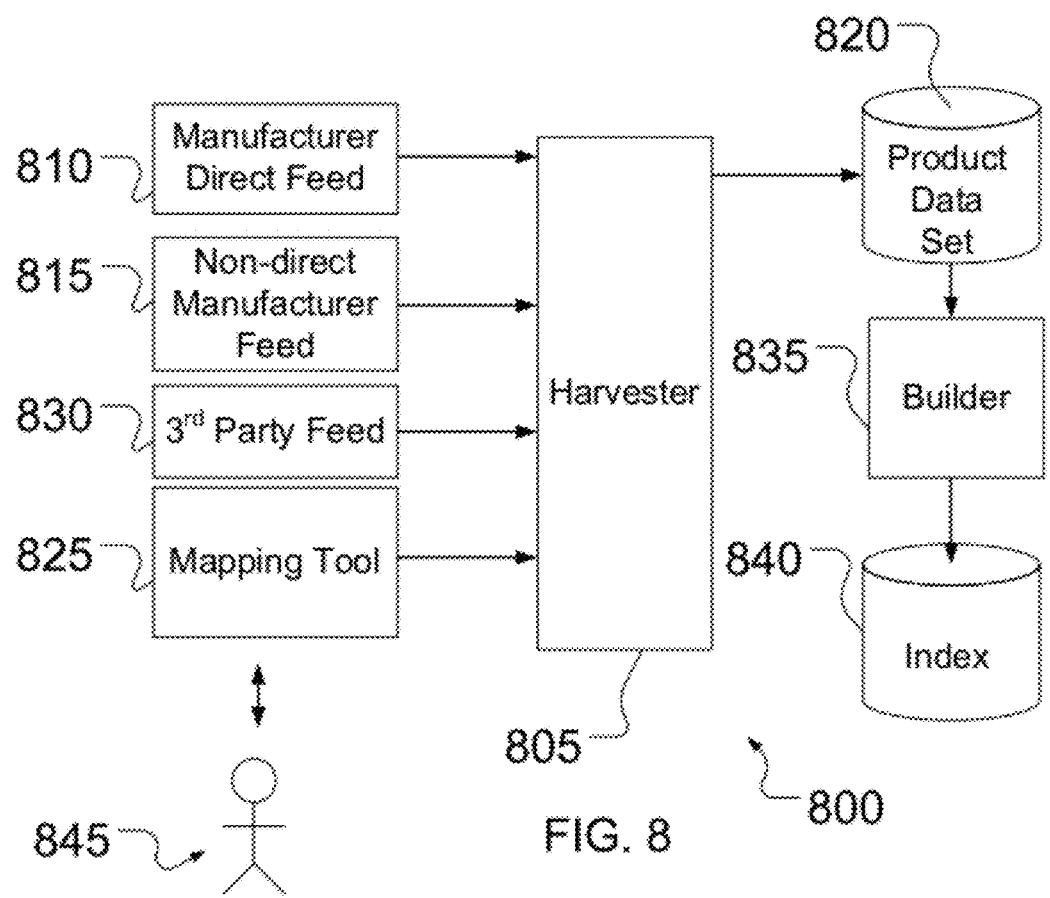
FIG. 8 shows a system configured to receive product data from a manufacturer direct feed, a non-direct manufacturer feed, or a third party feed and map the product data according to attributes in a standard schema.

FIG. 8 shows system 800 including a harvester 805 configured to receive product data from a manufacturer direct feed 810, a non-direct manufacturer feed 815, or a third party feed 830 and map the product data according to attributes in a standard schema, such as a schema according to the ontology of FIG. 3. Product data from direct feed 810 may include varying levels of hierarchies, for example product data from one manufacturer may include a line attribute value, a series attribute value, and a model attribute value for each product while direct feeds from other manufacturers may include only a line attribute value, or even only various products themselves with no hierarchy information. Of course, harvester 805 may be configured to receive product data from manufacturers having any level of tiers in their hierarchy.

Harvester 805 may include one or more modules configured to be executed to receive product data from a manufacturer direct feed 810, identify that the data is direct feed data from the manufacturer the product data is being received from, and store the product attributes in a standard schema in product data set 820 according to a map defined for that manufacturer. For example, if Manufacturer A provides line, series, and model attribute values for each product, then in response to receiving a direct feed of product data from Manufacturer A, harvester 805 may identify the received data as being received from Manufacturer A, and utilize a map specific to Manufacturer A to map received manufacturer, line, series, and model attributes in the standard schema in product data set 820. Alternatively, if Manufacturer B provides only a line attribute for each product, harvester 805 may identify data received from Manufacturer B and utilize a map specific to Manufacturer B to map received line attributes in the standard schema in product data set 820. Harvester 805 may also associate other attribute values with a record corresponding to each product, such as product specification attribute values (e.g., processor speed and hard drive size for a laptop) and a price or price range attribute value.

Harvester 805 may additionally receive product data from one or more non-direct manufacturer feeds 815. Non-direct manufacturer feeds 815 may be received from conventional commercial content services which generally provide line and model attribute information for a product. Harvester 805 may be configured to receive product data from a non-direct manufacturer feed 815, identify the manufacturer the products correspond to and that the data is being received from a non-direct manufacturer feed, and store the line attribute value, model attribute value, and other attribute values in a record for each product in the standard schema in product data set 820.

Harvester 805 may further receive product data from one or more third party feeds 830. Third party feeds 830 may be from retailers selling products who wish to sell their products directly through the electronic catalog or advertise their products by displaying them in the electronic catalog, for example BESTBUY™. Third party feeds 830 may generally provide only products with no additional identifiers (e.g., each product may have an unique SKU and various attribute values, but products may not be arranged within any taxonomy or hierarchy). Harvester 805 may be configured to receive product data from third party feeds 830, identify the products and product attribute values, and store a record including attribute values of each product.

For non-direct manufacturer feed 815 product data and/or for third party feed 830 product data, harvester 805 may additionally fill in attribute values corresponding to the standard schema based on the data received from manufacturer direct feed 810. For example, if a non-direct manufacturer feed 815 provides product data for an LENOVO™ IDEAPAD™ U350. and provides a line attribute with value "IDEAPAD™" and a model attribute with value "U350", harvester 805 may be configured to compute that the series is "U series" and to store the same as a series attribute value. Harvester 805, however, may also be configured to not fill in an attribute value corresponding to price of a product if no price is received in the feed.

Harvester 805 may also associate attribute values with lines, series, models, or other tiers, for example a model product attribute value may be a common screen size shared by all products within the model. Attribute values associated with lines, series, or models may be omitted from product records, thereby memory space may be saved in product data set 820. Alternatively, line product attributes, series product attributes, or model product attributes may be inherited and stored in each product record, thereby providing a discrete listing of attribute values associated with a product in the record for each product.

System 800 may also include a mapping tool 825 configured to normalize received product data and provide additional product data attributes for storing in the standard schema in product data set 820. Mapping tool 825 may have a user interface to allow a user 845 to manually define mapping of product attributes. For example, product data received corresponding to products from a manufacturer may not provide any line, series, or model attributes but may provide such data embedded in a product name. For example, if no line, series, or model product attributes were received for products from LENOVO™, but product records included a standardized product name in the format <MANUFACTURER> <LINE> <MODEL>, such as LENOVO™ IDEAPAD™ U350, a user may define a mapping to parse the product name for each record and extract attribute values corresponding to each of the product line, and product model. Additionally, logic may be implemented to extract series information, for example in this case the first alphanumeric digit of the model may be useful to identify the series. The mapping may then be used to automatically map future product data received from the manufacturer to the standard schema in product data set 820.

Alternatively, mapping tool 825 may be an automated tool configured to use computational linguistics or other logic to automatically extract a hierarchy of products based on one or more product attributes. For example, mapping tool 825 may analyze a record's product name and other attribute values to find commonalities between records by a manufacturer, may make best guesses as to a hierarchy of products for the manufacturer, and may map product data received from the manufacturer to the standard schema in product data set 820 according to the best guess. In such embodiments, new mapping rules created by an automated system may be provided to user 845 for manual confirmation of their accuracy or may be manually provided to a user 845 for pre-approval before going live.

System 800 may also include a builder 835 having modules configured to publish data to a search index 840. Builder 835 may, for example, generate unique hash values or other index values for each record and/or for the schema of product data set 820. Thus, search index 840 may be quickly queried for product records by either a product record's position within the ontology (e.g., search index 840 may be searched for all IDEAPADs™) and in response to the query, search index 840 may return unique identifiers for each record in the product data set 820 satisfying the query.

A benefit of providing an ontology of product records, such as providing a hierarchy of lines, series, and models for each manufacturer's products, is that attributes of products below each level of the hierarchy may be defined at the highest level in the hierarchy and inherited by lower levels of the hierarchy, thus, need not be manually provided in each record's attribute values. For example, all products in the APPLE™ MACBOOK AIR™ product line may have the value "ultraportable" for the product attribute "notebook type". Thus, each product record may not include the attribute value "ultraportable", but rather the attribute may be stored with the product line in an index. This may save processing time by requiring less product attributes to be stored, searched, and transmitted in conjunction with each record. Additionally, inherency of the hierarchy structure may help to normalize product data by filling in an attribute feature common to a product in a product line if the received product data (e.g., from a manufacturer direct feed or from a content service) is incomplete. Additionally, harvester 805 may increase accuracy by be configured to flag any product data that appears to be anomalous, for example if a record corresponding to a product in the APPLE™ MACBOOK AIR™ product line includes an "operating system" attribute having a value of "WINDOWS™ 7".

Harvester 805 may additionally normalize records by implementing standardized naming conventions. For example, product lines may be named in a format <MANUFACTURER> <LINE>, for example "LENOVO™ IDEAPAD™" or "ASUS™ EEE PC™". Likewise, models may be named in a format <LINE> <MODEL>, for example "IDEAPAD™ S10" or "EEE PC™ 1005HA". Series may be named to not include any other attribute values because series names may descriptive and identifiers of a series may be discernable from a model name. Of course, these naming conventions are exemplary only and others may be implemented depending on the purpose or intended use of a system.

Feeds may be harvested with line, model, and series attribute values for each product. However, as described above, some feeds may not include each of a line, model and series attribute value. Embodiments may require a subset of these attribute values, for example an embodiment may require a line and model attribute value but may have a series attribute value as only an optional attribute value. A system useful for implementing such an embodiment may, in response to receiving a product record missing one of a line attribute value and a model attribute value, write to a database and flag the feed that is missing part of the manufacturer's hierarchy. A custom tool may then interrogate a business owner for the missing information, the business owner may investigate/research what the model attribute value and/or line attribute value should be, the business owner may enter the missing data into the tool, and the toll may republish all impacted product records with the correct product family relationship in place (i.e., with both a line attribute value and a series attribute value). In this way, a product family ontology may be continuously built out.

Even once a user drills down to a model of products, for example by navigating a hierarchy of filters, many product records may show varying configurations within the model (e.g., a laptop model may have several hard driver sizes, processor speeds, etc.). These varying product configurations, and corresponding price variations, make it difficult for a user of an electronic catalog to determine what product they wish to buy. Additionally, this problem is compounded for electronic catalogs selling products within a model sold by different sellers. Some electronic catalogs have attempted to mitigate this issue by providing a single landing page for a model of products, allowing a user to select varying product attribute values within the landing page, and updating price and available seller information in response to the user's attribute value selections. For example, a landing page on AMAZON.COM™ for a NALGENE™ Tritan 1-Quart Wide Mouth BPA-Free Water Bottle allows a user to select attribute values for a "color" attribute. However, each time a user selects a different attribute value for color, product information varies, for example the price, seller, and shipping costs may all vary. This prevents a user from seeing all of their options; rather the user must repetitively navigate between each attribute value to determine what the best deal may be.

Figure 9A:
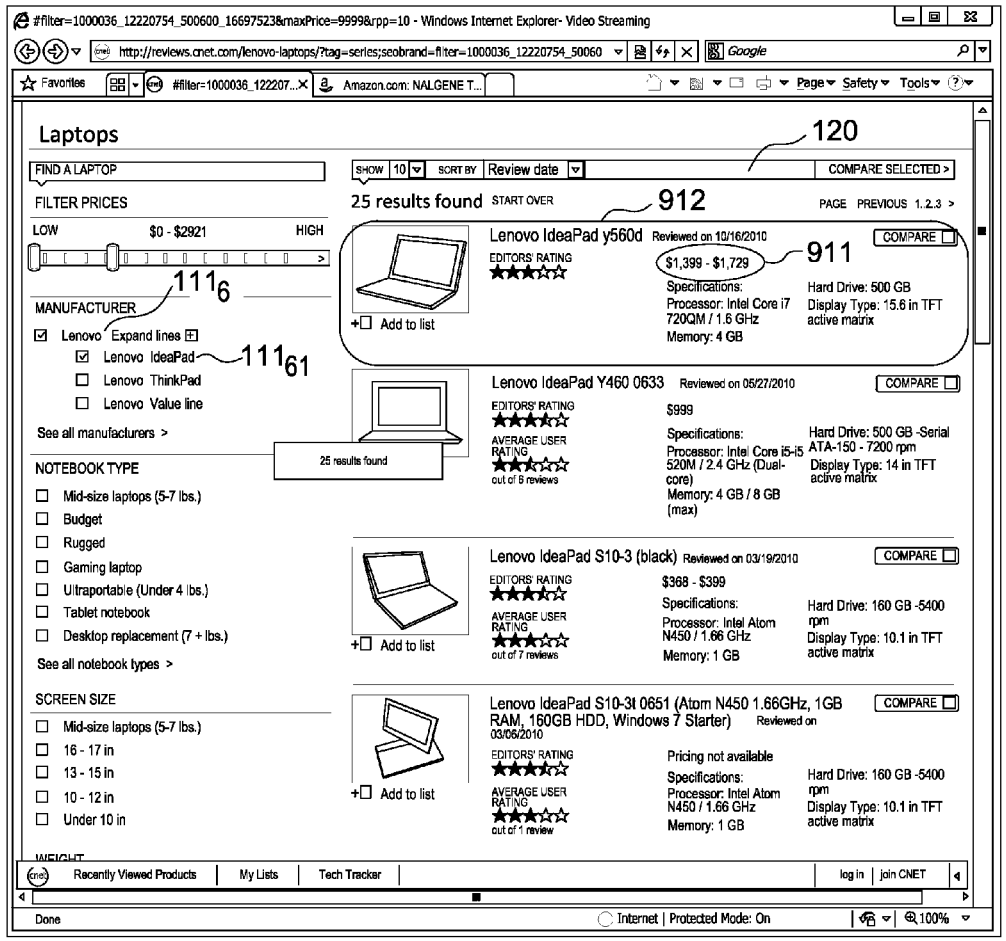
FIG. 9A is a screenshot of an exemplary webpage having plural rolled up models.

Embodiments may provide a model rollup module to consolidate pricing and product attributes for a model. The model rollup module may be configured to identify a "winner" product. For example, if a user is looking for an IDEAPAD™, the user may drill-down to the IDEAPAD™ product line by selecting filters shown in FIG. 9A. Rather than being presented with tens, hundreds, or even thousands of products within the IDEAPAD™ product line, each product possibly having only a minor difference from another, the user may be presented with a plurality of "winner" products, each of which may represent a distinct model. Each "winner" product may be a product most representative of a respective manufacturer, product line, product series, product model, or any other logical grouping of products. The "winner" product may be identified by a series of rules contained in the model rollup module. For example, the "winner" product may be the product that has the richest information in its product record, for example reviews (e.g., video reviews, user reviews, editorial reviews, etc.), images/video of the product, pricing, or other attribute values. In instances where no product record contains richer content than others, the "winner" product may be the product with the greatest popularity, for example measured by page views or leads (i.e., users clicking on a link from the product to purchase the product from a seller). FIG. 9A shows exemplary "winner" products resulting from a filter selection of LENOVO™ IDEAPADs™, including a "winner" product 910 for the LENOVO™ IDEAPAD™ Y550d model. Of course, alternative rules may be defined for selecting a winner. For example, rules may be user defined according to user preferences, such as a user may define a rule that they would like the "winner" product to be a product offered by a seller located geographically near the user.

Once the rollup module identifies the "winner" product, the rollup module rolls up the "winner" product to present the most complete and useful model information to the user. For example, the "winner" product may have its price rolled up to show a reviewed price, show a range of prices within the model, show a starting at price for the model, or show any other price information that may be useful to a user in determining if they want to purchase a product. If the "winner" product was reviewed, an "as reviewed" price may be presented to the user. Additionally, if the "winner" product is no longer offered for sale, a price of a product having similar attribute values may be provided. This may assist the user in comparing feature variations within a model, yet also providing the user with rich data regarding the model, even if the product with the richest data in the product record is no longer offered for sale. Additionally, all product records in the model corresponding to the various configurations may be queried for their respective prices and a price range, such as price range 911, may be presented to the user or a "starting at" price value may be presented to the user.

In an embodiment, a module may be built to be executed periodically, for example each day, to pass over every product grouping (e.g., line, series, and model) to determine a low price, a low price direct, an average price, a median price, a high price, a high price direct, and other price values for the group of product records aggregated by their line, series, or model. These pricing values may be stored in a database periodically, for example daily, and an API and front-end may pull from the database pricing data for product records that may not have their own but who may belong to a grouping (line/series/model) that does have pricing. Thus, more complete information may be provided to a user of an electronic catalog.

A rollup module may also be built to support the pull of a model, series, and/or line based on any product filter in that model, series, or line and then surface the winning product to the user. A count may also be surfaced to the user, for example to show how many products match a filter selection. The rollup module may be configured to keep counts accurate, because although model, series, or lines may match a user selection (i.e., may have a product that matches the user selection of attribute filters), product counts may vary because not all products in the same model, series, or line may match the selected attribute filter (i.e., the product's siblings may match the attribute filters but other products did not so should not be part of the overall search count). Thus, a rollup module may be configured to provide an accurate search count.

The rollup module may also roll up other attributes, for example by identifying attribute values common to the product line/series/model, attribute value options for products within the product line/series/model, "as reviewed" attribute values, "most popular" attribute values, "least expensive" attribute values, or any other aggregate of attribute values useful for a user browsing products to evaluate the value of a line/series/model.

Figure 9B:
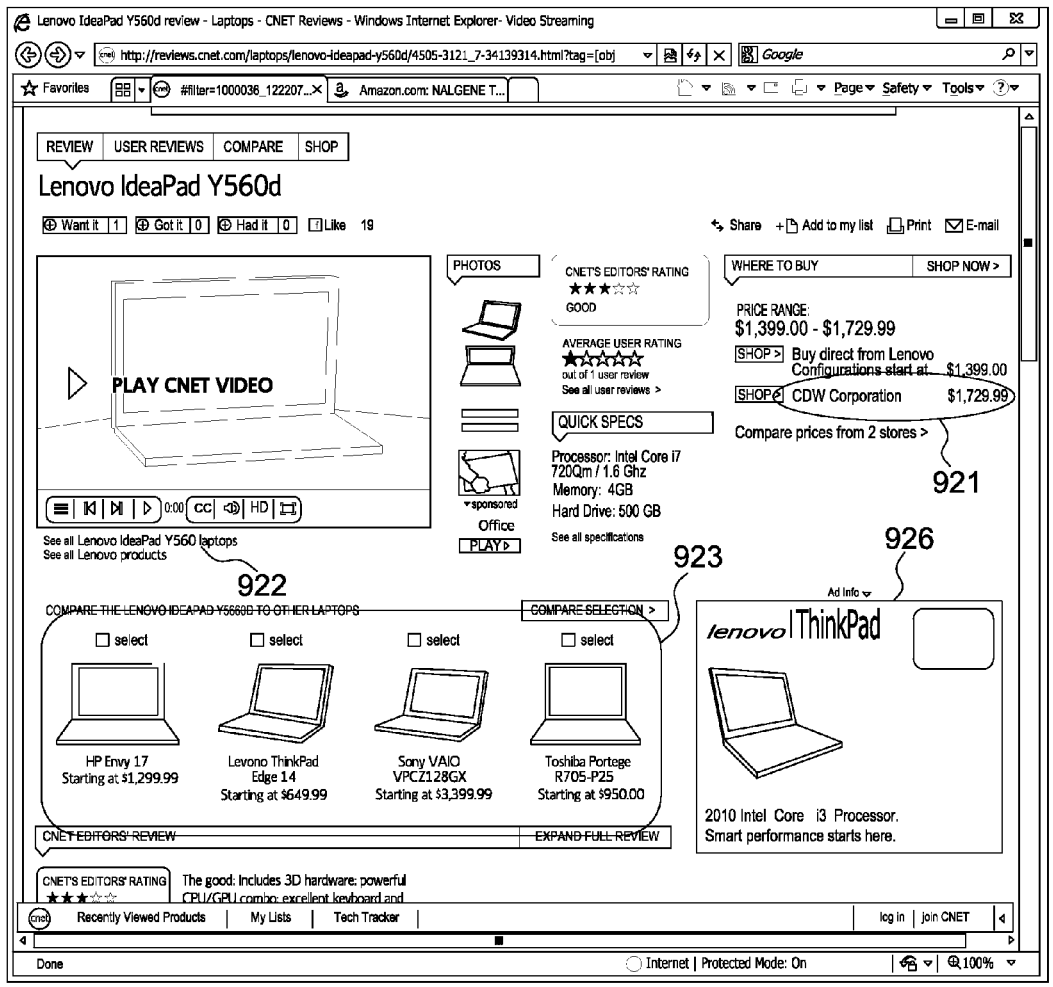
FIG. 9B is a screenshot of an exemplary landing page for a rolled up model.

A user interested in "winner" product 910 (i.e., the rolled up model) may select the product, for example by clicking hyperlink 912, and a landing page for the "winner" product may be shown, for example landing page 920 shown in FIG. 9B. Landing page 920 may provide various product information, such as reviews, pricing, specifications, and other information. For example, while the "winner" product 910 shown in FIG. 9A included a price range 911, product landing page 920 may include one or more specific offers 921 indicating the pricing by specific sellers for the "winner" product. Product landing page 920 may also provide a UI control 922 to allow a user to navigate to a comparison page 930 showing all products falling in the LENOVO™ IDEAPAD™ Y550. model.

Figure 9C:
FIG. 9C is a screenshot of a comparison page, including a plurality of product records within a model.

FIG. 9C shows comparison page 930, including a plurality of product records within a model. Comparison page 930 shows that even within a model, product attribute values and pricing may vary greatly. Additionally, it can be seen that "winner" product 910 indicates that it is the only product in the model that was reviewed. Thus, by a user viewing the "winner" product, the user may receive greater and more detailed information about a model than they may receive by directly viewing many products, each of which may provide much less information.

Of course, while pages 9A-9C illustrate a model rollup, the same process may provide product rollups at the product series or product line levels, or at any other hierarchy level in alternative product taxonomies having more levels.

Figure 9D:
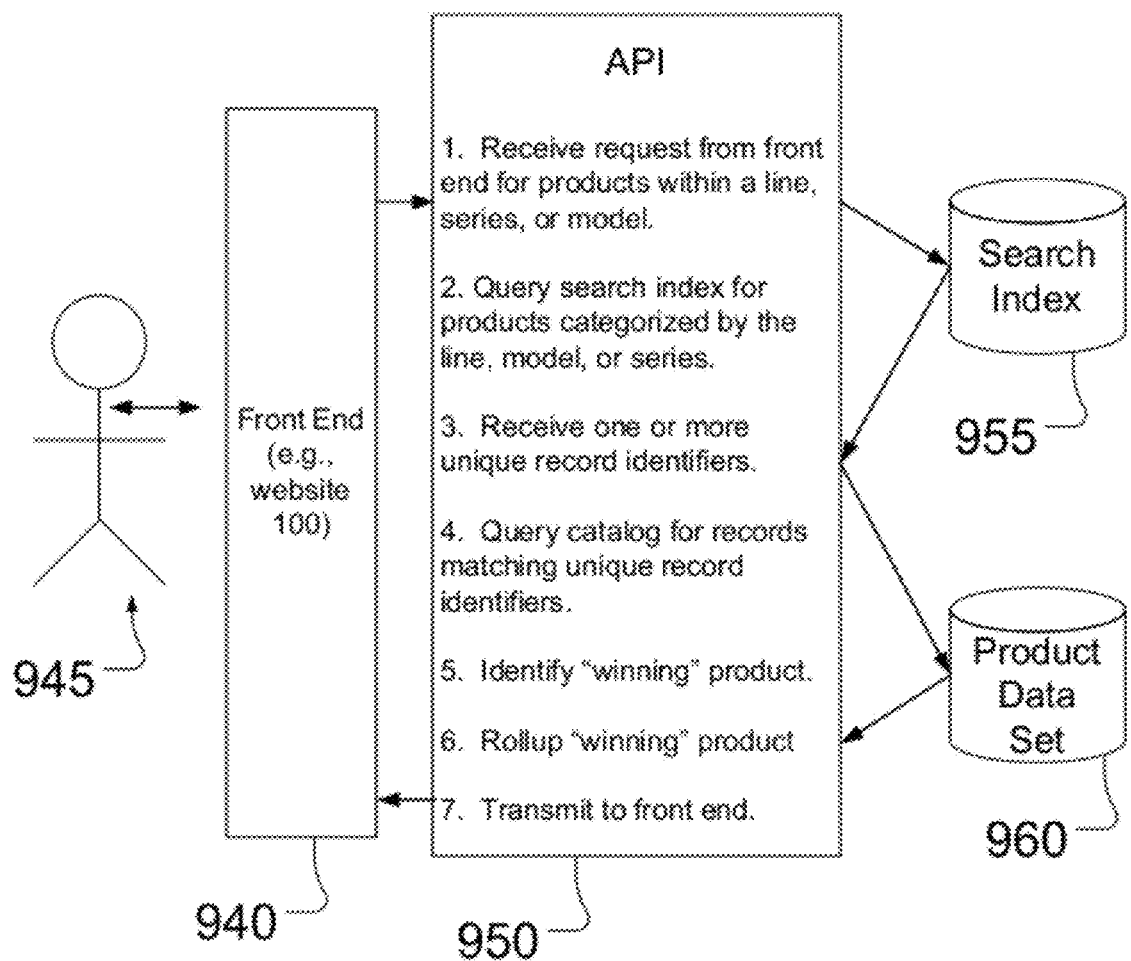
FIG. 9D is a data flow showing an exemplary process for receiving a request from a webpage for records corresponding to a manufacturer, product line, or product series and returning one or more product rollups for display.

FIG. 9D is a data flow showing an exemplary process for receiving a request from a webpage for records corresponding to a manufacturer, product line, or product series and returning one or more product rollups for display. The front end 940 renders a webpage, for example webpage 100 of FIG. 1, which may include a search area and a results area. The front end 940 provides UI features to allow a user 945 to navigate amongst a hierarchy of filters, for example expand/collapse control 142 shown in FIG. 1. The user 945 may then select an attribute value corresponding to a product manufacturer (e.g., LENOVO™ $111_6$. shown in FIG. 1), a product line (e.g., IDEAPAD™ $111_{61}$. shown in FIG. 1), or a product series (e.g., "Y Series" $111_{611}$. shown in FIG. 4B). For example, the front end 940 may receive user input though a user input device (e.g., a mouse) indicating that the user selects (e.g., checks or un-checks) an attribute value in the search area of the webpage corresponding to a manufacturer, product line, or product series. The front end 940 may then transmit one or more attribute values corresponding to the selected manufacturer, product line, or product series to an application programming interface ("API") 950. For example, webpage 100 of FIG. 1 may include instructions (e.g., HTML code, JavaScript code, asynchronous JavaScript and XML ("AJAX") code, etc.) instructing the front end 940 to automatically transmit an attribute value to API 950 when a user interacts with (e.g., selects, such as checking or un-checking) an attribute value corresponding to a selected manufacturer, product line, or product series.

API 950 may receive at least one attribute value from the front end 940 identifying one or more manufacturer, product line, product series, or product model. API 950 then transmits a query (e.g., sends an SQL query) to a search index 955 (e.g., a relational database, a flat database, or any other database), such as an index having a schema corresponding to the ontology of FIG. 3, for records that correspond to the selected attribute values (i.e., records associated with products corresponding to the selected manufacturer, product line, product series and/or product model). API 950 then may receive, in response to the query, one or more unique identifiers identifying records corresponding to the selected attribute values.

After receipt of the record identifiers, API 950 may transmit a query to a product data set 960 for records corresponding to the received unique identifiers. In response to the query, API 950 may receive records corresponding to the unique identifiers. API 950 may then search the received records according to a series of rules to identify a "winner" product. The rules may be, for example, 1) select a product record with a review of the product, 2) if more than one product record within the line/series/model has a review of the product, select the most popular (e.g., based on page views or leads), and 3) if no product record has a review of the product, select the most popular.

Once API 950 selects a winner, API 950 may roll up the "winning" product. API 950 may rollup the price, for example by computing a price range, an average price, a price "as reviewed", a "starting at" price, and/or any other price information. API may also roll up other attributes, for example by identifying attribute values common to the product line/series/model, attribute value options for products within the product line/series/model, "as reviewed" attribute values, "most popular" attribute values, "least expensive" attribute values, or any other aggregate of attribute values useful for a user browsing products to evaluate the value of a line/series/model.

Once API 950 identifies and rolls up one or more "winner" products within the selected line/series/model, API 950 transmits the one or more "winner" product records to the front end 945. The front end 945 may then receive the "winner" product records corresponding to the selected filters and update the webpage to show the "winner" product records. For example, FIG. 9A shows that an electronic catalog including rolled up "winner" product records in results area 120.

Embodiments of FIGS. 9A through 9D may provide substantial increases in click through rates and lead rates, especially when implemented in product catalogs having rich data corresponding to one or more product records within a line/series/model while having less data corresponding to one or more other product records within a line/series/model (as may be the case when sellers provide their product information to sell in the catalog while the catalog owner provides rich product data such as reviews for products). Implementation of embodiments similar to those shown in FIGS. 9A through 9D have provided click through rates and leads of about 20%, which is much higher than the average 0.5-2% generally found in an electronic catalog. These metrics evidence great improvement. Embodiments of FIGS. 9A through 9D also may alleviate the problem of having product records with rich data getting pressed down in the rankings because a product record with less data has a lower price. Further, these embodiments may solve the problem many electronic catalogs face in that a minor variation of a product makes a prior product obsolete, thus causing the prior product to be removed from an electronic catalog even though it contains rich data (e.g., editorial reviews and user reviews) that may assist users looking to purchase the related new variation of the same model.

Product rollups may also be implemented in other systems having product records not stored according to a tiered hierarchy. For example, product records in a conventional electronic catalog may have a plurality of attribute values but no attributes and corresponding values to arrange the products within a line, series, model, or similar grouping. In such a product catalog, an API may be configured to search all records for records corresponding to a user's selection (e.g., records corresponding to a free language search or to a filter selection), mine attribute values from each product record, identify a set of similar product records (e.g., the set of similar product records may be analogous to a line, series, or model depending on the identification logic), identify a "winner" product record within a set of similar product records, and rollup the "winner" product record based on the attribute values of other product records in the set of similar product records.

Additionally, when a user is browsing products in an electronic catalog, the user's browsing experience may be improved by presenting the user with similar or aligned products that they may be interested in. This may be especially helpful to a user that knows generally the type of product they may be looking for, but may not have in-depth knowledge of various product attributes and various brand offerings, thereby making it difficult for the user to identify a desired product either through a free language search or through brand/line/series/model filters or other attribute value filters.

Embodiments may render similar products on a webpage display to assist a user in finding a product they wish to purchase. For example, similar products unit 923 shown in FIG. 9B displays four laptops similar to the LENOVO™ IDEAPAD™ Y560d (i.e., the recommendations are similar to the product the landing page is directed toward). To determine products to display, a similarity module may implement rules based on product attribute values and/or data collected from user traffic to provide similar products to a user, thereby allowing a user to quickly form a product comparison.

Figure 10A:
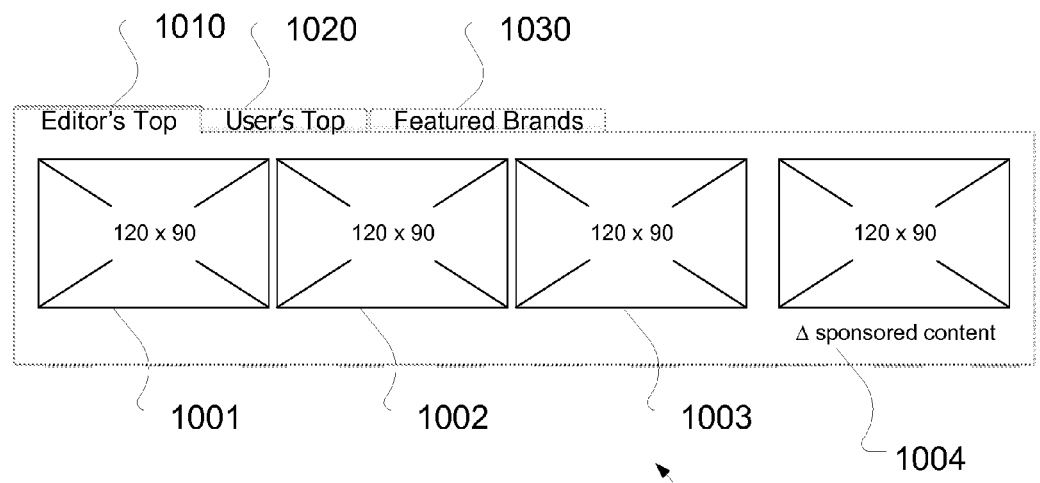
FIG. 10A shows an exemplary similar items unit configured to select similar products that may be displayed to a user.

FIG. 10A shows an exemplary similar items unit 1000 configured to select similar products that may be displayed to a user, for example on a search page (e.g., similar items unit 1000 may be rendered on search page 100 shown in FIG. 1) or on a landing page (e.g., similar items unit 1000 may be rendered in place of similar products unit 923 shown in FIG. 9B). Similar items unit 1000 may include plural (e.g. three) user selectable tabs, such as editor's top 1010, user's top 1020, and featured brands 1030. Each tab may be selected to display one or more, such as four, identifiers 1001-1004 of products similar to the product search by the user (e.g., similar to selectable filters on a search page, or similar to the main product on a product landing page). Of the similar product identifiers 1001-1004, one or more may represent sponsored content, for example similar product identifier 1004 shown in FIG. 10A.

In editor's top tab 1010, similar product identifiers may be identified by the similarity module identifying a plurality of product records for products having attribute values similar to either selected filter values, if on a search page, or product attribute values or product rollup attribute values, if on a landing page. Once product records for similar products are identified, the similarity module may select the three product records having the highest editor's rating.

In user's top tab 1020, similar product identifiers may be identified by the similarity module identifying similar product records in the same fashion as editor's top tab 1010. Once product records for similar products are identified, the similarity module may analyze both users' ratings of each identified product record as well as user traffic information relating to each product record. User traffic information may include, for example, page views, leads, searches for a product, or any other useful traffic information. The similarity module may then select a plurality of the identified records based on the similarity of each product record, user ratings of each product record, and traffic information relating to each product record. The similarity module may, for example, apply rules or a decision matrix to select a plurality of the identified records.

In editor's top tab 1010 and in user's top tab 1020, one or more of the similar product identifiers may be selected from a plurality of sponsored records. For example, each product record may have an attribute value identifying either whether the record is sponsored or identifying a level of sponsorship (e.g., a gold sponsored product might be displayed more often or more prominently than a silver sponsored product). Alternatively, a separate data set may store sponsored product records. A sponsored similar product identifier 1004 may be selected in the same fashion as similar product identifiers 1001-1003 except a rule may require that the product record correspond to a sponsored product. The rules or decision matrix implemented in the similarity module may be configured to provide a deep ranking of similar products, thereby allowing selection of a sponsored product that may not be as similar as the other selected similar product identifiers (e.g., the sponsored similar product identifier 1004 may share less common attribute values with the main product).

In featured brands tab 1030, similar product identifiers may be identified by the similarity module identifying similar product records in the same fashion as editor's top tab 1010. Next, the similarity module may select the most highly sponsored products (e.g., the products with the highest sponsorship level), for example by determining the four products with the highest sponsorship level out of a number of similar products (e.g., twenty-five). The selected similar product identifiers may then be displayed in featured brands tab 1030. Alternatively, after identification of a plurality of similar product records, the similarity module may query a data set identifying which product records receive the most leads (e.g., most leads all together, highest percentage of leads per times displayed, etc.), and select similar product records with the most leads. Thus, featured brands tab 1030 may maximize revenue by either displaying similar product identifiers that receive the greatest revenue when selected and/or displaying similar product identifiers that are most likely to be selected and thereby receive the most consistent revenue.

A similarity module may include additional rules as well. For example, a similarity module may include a rule that, in the case of a tie, product records associated with the most popular products should be displayed. Additionally, a rule may be implemented specifying that not more than a certain number of product records from a certain manufacturer/line/series/model should be displayed. Of course, any other rules may be implemented as well.

Figure 10B:
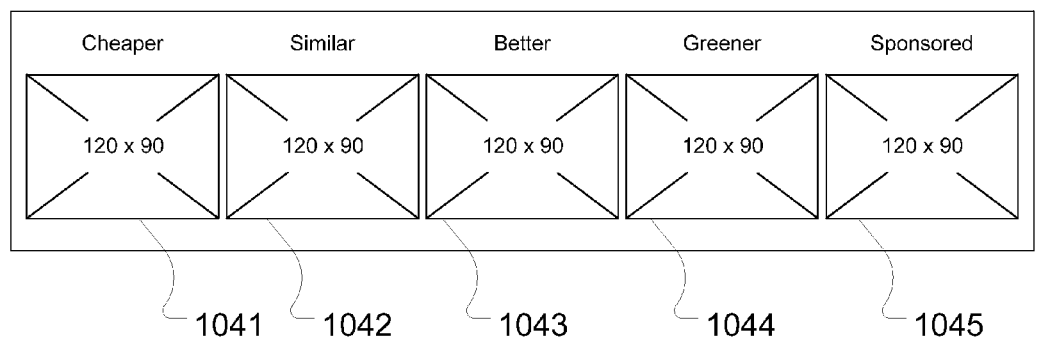
FIG. 10B shows an alternative exemplary similar items unit of similar products that may be displayed to a user.

FIG. 10B shows an alternative exemplary similar items unit 1040 of similar products that may be displayed to a user. Similar items unit 1040 may display a plurality of similar product identifiers 1041-1045, each of which may have a unique set of rules for determining the similar product identifier for display.

Cheaper similar identifier 1041 may be selected by a similarity module first identifying similar product records, for example in the same fashion as in editor's top tab 1010 described above. The similarity module may then apply a set of rules to determine the most similar product identifier (e.g., having the most common attributes) and having a lower price. Additionally, balancing logic may be implemented, for example, to display a product record slightly less similar to the main product if the price is significantly lower (e.g., >5% or >10% lower).

Similar identifier 1042 may be selected by a similarity module identifying the most similar product record. The similarity module may additionally apply rules to ensure variety, for example by requiring that the similar product record be from a different manufacturer, different product line, or different product series. Such a rule may ensure that the user is not simply displayed essentially the same product with a very minor difference.

Better identifier 1043 may be selected by a similarity module first identifying similar product records, for example in the same fashion as in editor's top tab 1010 described above. The similarity module may then select the most similar product record having the highest editor ranking for display. Additionally, balancing logic may be implemented, for example to display a product record slightly less similar to the main product if the editor ranking is significantly higher (e.g., a half star or whole star higher).

Greener identifier 1044 may be selected by a similarity module first identifying similar product records, for example in the same fashion as in editor's top tab 1010 described above. The similarity module may then select the most similar product with the highest "green" rating for display (i.e., the most environmentally friendly product). For example, a data set containing the product records may have an attribute value providing a "green" rating for each product in the data set. For electronics, such as computers, televisions, etc., the "green" rating my take into account factors such as power consumption, amount of recycled material used in manufacturing the product (e.g., is a laptop's case made of recycled plastic), the carbon footprint of disposing of the product (e.g., a laptop with a six-cell battery may be less environmentally friendly than a laptop with a three-cell battery), or other factors. Additionally, balancing logic may be implemented, for example to display a product record slightly less similar to the main product if the "green" ranking is significantly higher.

Sponsored identifier 1045 may be selected in similar fashion to sponsored content 1004 described above or in similar fashion to the identifiers in featured brands tab 1030 described above.

Alternatively, each identifier 1041 through 1045 may be selected exclusively from sponsored content. This may be particularly useful in large electronic catalogs or other data sets where many brands and/or manufacturers sponsor content. In such situations, a data set may be sufficiently diverse to effectively show similar products that are cheaper, better, greener, have higher editor ratings, and/or have higher user ratings while not degrading the usefulness of the classification. Of course, any other attribute classifications may be used to recommend similar products that may be of interest to a user.

While disclosed embodiments may query data sets local to a server or within the same firewall as the server, other embodiments may access remote data sets for attribute values to assist with identifying product records to display to a user. For example, a third party may provide data ranking how "green" various products are. Alternative embodiments may query such a third party for each similar product in order to identify the most "green" similar product.

Additionally, or alternatively, an allied items unit may be rendered on a webpage in similar fashion to similar items units 1000 or 1040. Allied products may, for example, have a common attribute related to the main product but the allied products may themselves not be similar to the main product. Allied products may include, for example, accessories, connectors, parts, supplies, and related services. Thus, for a laptop main product, allied products may be service plans, carrying cases, replacement batteries, external drives, cables, internal components, etc. Automated generation of optimized allied products useful for cross-selling products allied with a main product is disclosed in U.S. patent application Ser. No. 11/702,662. filed on Feb. 6, 2007, the entire contents of which are incorporated herein by reference.

Of course, other factors may be taken into account when generating either similar product identifiers or allied product identifiers. For example, the user browsing an electronic catalog may be profiled, thus allowing the similarity module to recommend products identified as matching or being complementary to the user's profile. User profile information may be used to supplement the similar product categories described above (e.g., a cheaper, similar product may be identified that also matches or complements the user's profile). An API may determine a user's profile by tracking their actions on a site. For example, if the user browses several pages of inexpensive laptops, a plurality of or all of the similar products identified to the user may be cheaper than the main product a user may currently be browsing. Additionally, tracked user behavior may indicate that identification of similar products to be displayed should focus more on price than on similarity of the products to the main product.

In addition to page views, other analytics of a user's browsing habits may allow more accurate presumptions of a user's likes and dislikes. For example, even if a user goes through many different brands of laptops in an electronic catalog, it is likely that the user has a stronger affinity toward brands that the user first browsed. Likewise, if a user browsed a broad array of somewhat related products but later narrowed the search to fewer and more highly related products, the user's earlier browsing history may be disregarded as only preliminary research and not as an indication of products the user may be interested in purchasing. Cookies may further be used to track the user's activities on an electronic catalog between sessions.

Moreover, cookies stored on a client computing device (e.g., the computing device being used by the user searching the electronic catalog) may be analyzed to determine the user's browsing habits and/or browsing history and products may be identified for the user based on such habits or history. For example, if cookies reveal that a user has recently been to <WWW.WIRELESS.ATT.COM>, <WWW.VERIZON-WIRELESS.COM>, and <WWW.SPRINT.COM>, the similarity module may deduce that a user browsing mobile phones may also be interested in offers for service plans from service providers. Contrastingly, if cookies reveal that a user has visited <WWW.VERIZONWIRELESS.COM>but no other wireless carrier's website, the similarity module may deduce that a user browsing mobile phones has VERIZON WIRELESS™ as their wireless carrier and, thus, only display similar products or allied products supported by the carrier.

Additionally, a user's perception may be gathered, for example, by mapping the user's facial response to a product, for example by using an optical device operatively coupled to the device displaying the advertisement, such as an APPLE™ IBOOK™ or a netbook with a webcam. It is well established that facial responses can be correlated to emotion. See, for example, "The Role of Facial Response in the Experience of Emotion," Journal of Personality and Social Psychology, 37(9): 1519-31, September 1979, the disclosure of which is incorporated herein by reference in its entirety. A facial expression recognition system, such as the system disclosed in U.S. Pat. No. 7,624,076. to Movellan et al., the disclosure of which is incorporated herein by reference in its entirety, may be useful for detecting a user's facial response to products in an electronic catalog. A consumer's facial response to a main product, for example, neutral, anger, disgust, fear, joy, sadness, or surprise, may correlate to a user's perception of the product. Thus, if a person's facial response indicates that they likely prefer products with certain attribute values (e.g., laptops with larger screens), the similarity module may identify similar laptop products having larger screens to display to the user.

Embodiments for identifying similar products to a user may be particularly helpful for users browsing a category of products with greatly varying attributes. For example, mobile phones have many varying features and can be overwhelming for a user to initially narrow their search. By analyzing similar products and allied products, and by combining such analysis with user profile data, identified similar products may help the user quickly narrow their field of search and identify desired products.

Of course, while similar products and allied products are generally discussed above with reference to products such as laptops and mobile phones, embodiments of electronic catalogs for browsing other products, including other goods, digital content, or even catalogs of services offered, may provide identification or recommendation of similar products that may be of interest to a user. In fact, embodiments disclosed herein may be useful for providing similar recommendations to any data set of organized or cataloged data. For example, archived television shows may have many attributes, for example genre, actors/actresses, channel, length per episode, etc. Values of these attributes may be useful for identifying related television shows, and then related television shows may be recommended based on a criteria, such as similar, better (e.g., having a higher editorial rating), greener (e.g., studio producing the show makes active steps to reduce its carbon footprint), etc. Of course, some criteria may only be relevant to certain types of data stored in electronic catalogs. For example, "low fat" may be a useful characteristic for recommending similar recipes stored in an electronic catalog of recipe documents, however would likely not be useful for recommending similar laptops in an electronic catalog of laptops.

Figure 10C:
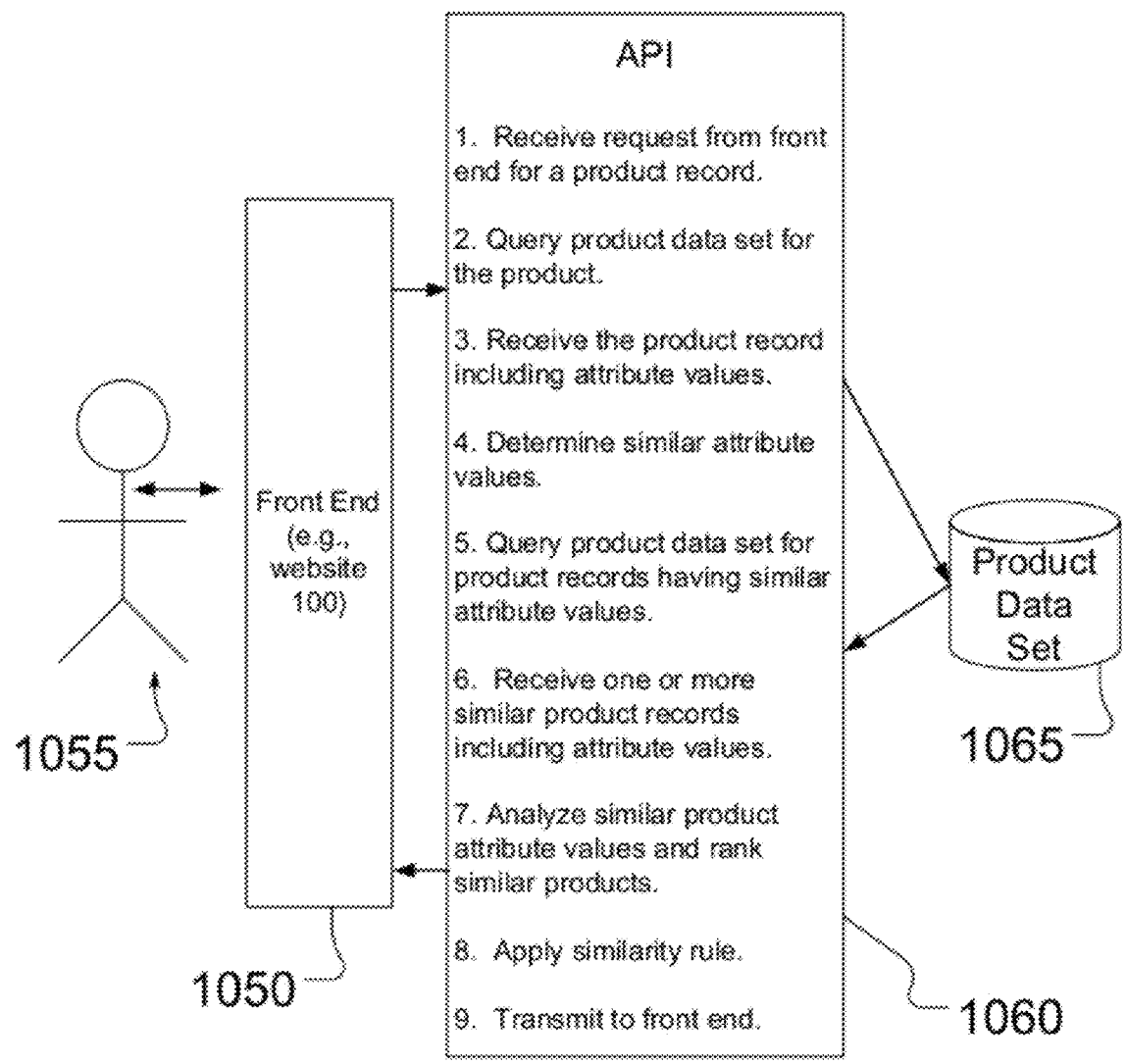
FIG. 10C is a data flow showing an exemplary process for receiving a request form a webpage for a product record, or alternatively for records corresponding to a manufacturer, product line, or product series, and returning one or more similar product records for display.

FIG. 10C is a data flow showing an exemplary process for receiving a request form a webpage for a product record, or alternatively for records corresponding to a manufacturer, product line, or product series, and returning one or more similar product records for display. On front end 1050, a front end renders a webpage, for example webpage 100 of FIG. 1, which may include a search area and a results area. The user may perform a search, for example using selectable filters or a text based search. The front end 1050 may then transmit one or more attribute values corresponding to the search, for example corresponding to a specific product or to a manufacturer, product line, or product series to an API 1060.

API 1060 may receive a request from the front end for a product. API 1060 may then query a product data set 1065 for the product record for the requested product. API 1060 may then receive the product record, including attribute values for the product record. A similarity module executed on a computing device may then determine similar attribute values to the attribute values received from product data set 1065. For example, a similarity module may apply rules, a decision matrix, or other logic to determine similar attribute values. API 1060 may then query the product data set 1065 for records corresponding to the similar attribute values and, in response, receive similar product records. API 1060 may then analyze the attribute values of the similar product values and rank the similar product records.

API 1060 may then apply a similarity rule to the ranked similar product records. For example, API 1060 may apply a rule to determine a similar product record that is cheaper, greener, or better than the product record initially requested. For this determination, weighting or balancing of attribute values may be applied, for example to promote a product record that may not be quite as similar as the requested product record, but may be substantially cheaper than the requested product record. Once API 1060 applies the similarity rule, API 1060 transmits one or more similar product records to the front end 1050. The front end 1050 may then receive one or more similar product records corresponding to the search and update the webpage to show the similar product records.

Of course, other embodiments may provide similar product records to a search for a manufacturer/line/series/model. Such an embodiment may include an additional step of searching an index to identify attribute values of the manufacturer/line/series/model before determining similar attribute values.

As explained above, API 1060 may further implement steps to profile a user, to track site traffic, to identify user cookies, or take other analytical steps to customize the returned similar product records to a specific user.

While profiling a user is described above with reference to determining similar products to display to a user, in the context of rolling up products, user profile information may be useful in determining a rolled up product to display to a user. User profile information may, for example, be particularly useful in rolling up to a high level in a hierarchy, for example to a product line, when the product line contains many products having reviews.

While the foregoing describes how determination of similar products and allied products, as well as user ratings, user profiling, and other features, may be useful for providing to a user products in an electronic catalog they may be interested in, the same information, techniques, systems, and processes may be useful for determining other content to display to a user on a webpage, such as creatives (e.g., ads).

Creatives may additionally be displayed on a website configured to present a user with an electronic catalog according to a conquest model or an aligned model. For example, FIG. 4A shows a creative 130 for DELL™ in response to a user's filter selection for a LENOVO™ IDEAPAD™. Accordingly, under a conquest model, a purchaser of creatives may buy out their competitor's space in an attempt to sway a user's opinion of the competitor's products or to influence the user to look at the creative purchaser's products rather than the competitors. In contrast, FIG. 9B includes creative 926 for LENOVO™ in response to a user browsing to a landing page for a LENOVO™ product. Thus, under an allied model, a purchaser of creatives may attempt to reinforce a user's presumed interest in the creative purchaser's products.

Additionally, both the conquest model and the allied model may be supplemented by user profile information. For example, DELL™ may have a plurality of creatives, such as creatives advertising desktop replacement laptops as well as netbooks. If profile information about a user indicates that the user has spent a disproportionate amount of time looking at netbooks as opposed to desktop replacement laptops, under either a conquest model or allied model a creative may be selected for a netbook even when a user is currently viewing a desktop replacement laptop.

While embodiments have discussed reviews associated with a product and rolling up the product having the review up to a line/series/model, other embodiments may allow for creation of manufacturer/line/series/model level reviews. For example, a general review may be given to a product line, such as relating to the general durability of the product line, and such a review may be inherited by all series, models, and products within the product line.

Additionally, manufacturers/lines/series/models may have attribute values associated with rules, thereby limiting the inherency of the attribute value to products within the tier satisfying the rule. Thus, a run of the content against the underlying rule may take a snapshot of the set of product records that meet the conditions of the rule and map the attribute value to each product record that belongs to the set. Such a feature may allow mass mapping of editorially generated content about a manufacturer line, series, and/or model against the products that belong to that manufacture line, series, and/or model. Because this is rule-based, such attributes may be dynamically associated with new or changed product records with each snapshot (i.e., run). Such a snapshot may be run periodically (e.g., a cron process may be setup) or after each time product records are added, removed, and/or modified.

Organization of product records according to an ontology additionally may allow for mapping or graphing of data points related to the ontology. For example, graphs and/or other visual representations may be created showing median, average, mean, or other data points per all of a manufacturer's product records, or a line, series, or model. Systems and methods may use graphing technologies to provide visual representations across a set of products that form a manufacturer line, series, and model. The set of product records that form part of a manufacturer, line, series, or model may be based on product attribute value groupings. The product attribute value groupings themselves may also be broken down to provide relevant information to users across a set. This may be, for example, statistical breakdowns on specifications (e.g., screen size), price, etc. within a set. Additionally, once these stats are determined by set, they may be used to present comparisons across manufacturer lines, series, or models. For example, average price for a DELL™ product line may be presented in comparison to the average price of an HP™ product line.

An ontology of product records may additionally allow for forums or other systems for user generated content to be received and/or captured related to various manufactures or their product lines, series, and models. Such user generated content may then be useful for mining user opinion or reception of products within a product line, series, or model. The mined data may be used for ranking and/or rating products. Additionally, portions of the user generated content may be stored as product attribute values. For example, if a user writes "this is a very durable laptop" about a specific product in a forum, a quote of the user generated content may be stored as an attribute value for a product record in similar fashion to a user review entered directly into an electronic catalog regarding a product.

Additionally, embodiments may determine the quality of user generated content, for example user generated manufacturer reviews, product line reviews, product series reviews, and product model reviews, and may determine whether user generated content may be useful for ranking and/or rating product groups or for other processing and/or use. U.S. Pat. No. 7,363,214, the entire contents of which are incorporated herein by reference, discloses systems and methods for determining the quality of written product reviews to distinguish the user reviews for further use or processing. Embodiments disclosed herein may determine quality of written manufacturer reviews, product line reviews, product series reviews, or product model reviews to determine the quality of user reviews and distinguish which user reviews are suitable for further use or processing.

In addition to the ontology provided above, embodiments provide for other relationships to be defined on top of the line/series/model ontology. For example, a user may define their own product groupings, for example "lines best used for X", "models that are green", "THINKPADS™ that really perform". These user defined relationships may be sub-relationships within a grouping of the ontology (e.g., "THINKPADS™ that really perform" may be a subgrouping of a THINKPADS™ product line with higher performance ratings than others) or may span multiple separate groupings (e.g., "models that are green" may include laptops by both DELL™ and HP™). This may allow creation of filters for an electronic catalog particular to a user demographic.

Further still, lines, series, models, and other ontology groupings may have attributes defining common or associated terms. Thus, embodiments may include a "did you mean" feature that may suggest similar filter searches or free text searches presuming a search a user might have intended or may be interested in. Such a system may map user entered search terms to a manufacturer line, series, and/or model by generating line, series, and/or model keywords based on frequency of product keywords in the underlying product set.

Embodiments may also automatically create text descriptions of a manufacturer's products in general or of a product line, series, or model. For example, U.S. patent application Ser. No. 10/430,679, filed May 7, 2003, the entire contents of which are incorporated herein by reference, discloses a system and method for automatically generating a naturally reading narrative product summary including assertions about a product. Similar systems and methods may be useful for automatically generating naturally reading narrative product line, series, and model summaries by determining aggregate attribute values associated with the respective product line, series, and model.

Product information can be gathered in any manner, such as through a data feed or in an automated manner. For example, U.S. Pat. No. 6,535,880, the entire contents of which are incorporated herein by reference, discloses an automated method and apparatus for collecting product information. Products can be any item, such as electronics items, digital content, including downloadable and streaming content, or other items.

While the above disclosure generally refers to systems and methods for filtering an electronic catalog, similar methods and systems may be useful for a search of an electronic catalog, such as a plain language search or a Boolean search. For example, search area 120 of FIG. 1 may include a text box configured to allow a user to search an electronic catalog by entering a search phrase.

Embodiments may also implement caching strategies and caching functions to improve performance of searching or filtering a data set. For example, queries may be performed on a data set prior to a user interacting with a UI. In such instances, results of the queries may be cached and the cached query results may be transmitted in response to receipt of a search (e.g., selection of a filter record attribute) from a user.

Embodiments described herein frequently refer to databases, data stores, and the like. These terms are used generally to describe any data set, such as a structured data source, including indexes, hashes, databases, data stores or other systems for storing data.

Additionally, embodiments described herein generally refer to process steps performed on various modules, for example on a front-end, on an API, etc. Of course, one of ordinary skill in the art understands that in alternative embodiments, these steps are not limited to being performed in the exemplary setup shown herein. In alternative embodiments, more or less steps may be performed on an API or front-end, or any intermediary or external devices or modules may perform the disclosed or additional steps.

Embodiments have been disclosed herein. However, various modifications can be made without departing from the scope of the embodiments as defined by the appended claims and legal equivalents.

What is claimed is:

1. A computer-implemented method for providing navigation of a plurality of records having attributes by one or more computing devices, the method comprising:

transmitting, by at least one of the one or more computing devices, a page configured to display a plurality of hierarchies of selectable filters corresponding to a plurality of manufacturers, wherein each of at least two of the hierarchies in the plurality of hierarchies corresponds to a different manufacturer, and is organized according to that manufacturer's product taxonomy;

receiving, by at least one of the one or more computing devices, at least one attribute value based on a filter selection;

transmitting, by at least one of the one or more computing devices, a query to a product data set for one or more product records in the product data set corresponding to the at least one attribute value;

receiving, by at least one of the one or more computing devices, the one or more product records; and transmitting, by at least one of the one or more computing devices, the one or more product records.

2. The method of claim 1, wherein at least one hierarchy in the plurality of hierarchies corresponds to a manufacturer product taxonomy which divides product records into a tiered hierarchy comprising at least one of a product line tier, a product series tier, and a product model tier.

3. The method of claim 2, wherein the the tiered hierarchy comprises a product line tier, a product series tier, and a product model tier.

4. The method of claim 2, wherein at least one of the one or more product records indexed in the product data set corresponds to two or more tiers in the tiered hierarchy.

5. The method of claim 4, wherein said product records are also indexed in the product data set according to a user defined ontology unrelated to the plurality of hierarchies-corresponding to the plurality of manufacturer's products.

6. The method of claim 2, wherein one or more tiers in the tier hierarchy include one or more tier attribute values.

7. The method of claim 6, wherein one or more product records in the one or more tiers inherit attribute values from the one or more tier attribute values.

8. The method of claim 7, wherein one or more rules define a subset of product records in the one or more tiers that inherit attribute values from the one or more tier attribute values.

9. A system for providing navigation of a plurality of records having attributes, the system comprising:
one or more processors; and
one or more memories operatively coupled to at least one of the one or more processors and having instructions stored thereon that, when executed by at least one of the one or more processors, cause at least one of the one or more processors to:
transmit a page configured to display a plurality of hierarchies of selectable filters corresponding to a plurality of manufacturers, wherein each of at least two of the hierarchies in the plurality of hierarchies corresponds to a different manufacturer, and is organized according to that manufacturer's product taxonomy;
receive at least one attribute value based on a filter selection;
transmit a query to a product data set for one or more product records in the product data set corresponding to the at least one attribute value;
receive the one or more product records; and
transmit the one or more product records.

10. The system of claim 9, wherein at least one hierarchy in the plurality of hierarchies corresponds to a manufacturer product taxonomy which divides product records into a tiered hierarchy comprising at least one of a product line tier, a product series tier, and a product model tier.

11. The system of claim 10, wherein at least one of the one or more product records indexed in the product data set corresponds to two or more tiers in the tiered hierarchy.

12. The system of claim 11, wherein said product records are also indexed in the product data set according to a user defined ontology unrelated to the plurality of hierarchies-corresponding to the plurality of manufacturer's products.

13. The system of claim 12, wherein one or more rules define a subset of product records in one or more tiers of the tiered hierarchy that inherit attribute values from one or more tier attribute values associated with the one or more tiers.

14. At least one non-transitory computer-readable medium storing computer-readable instructions that, when executed by one or more computing devices, cause at least one of the one or more computing devices to:
transmit a page configured to display a plurality of hierarchies of selectable filters corresponding to a plurality of a manufacturers, wherein each of at least two of the hierarchies in the plurality of hierarchies corresponds to a different manufacturer, and is organized according to that manufacturer's product taxonomy;
receive at least one attribute value based on a filter selection;
transmit a query to a product data set for one or more product records in the product data set corresponding to the at least one attribute value;
receive the one or more product records; and
transmit the one or more product records.

15. The at least one non-transitory computer-readable medium of claim 14, wherein at least one hierarchy in the plurality of hierarchies corresponds to a manufacturer product taxonomy which divides product records into a tiered hierarchy comprising at least one of a product line tier, a product series tier, and a product model tier.

16. The at least one non-transitory computer-readable medium of claim 15, wherein at least one of the one or more product records indexed in the product data set corresponds to two or more tiers in the tiered hierarchy.

17. The at least one non-transitory computer-readable medium of claim 16, wherein said product records are also indexed in the product data set according to a user defined ontology unrelated to the plurality of hierarchies-corresponding to the plurality of manufacturer's products.

18. The at least one non-transitory computer-readable medium of claim 17, wherein one or more rules define a subset of product records in one or more tiers of the tiered hierarchy that inherit attribute values from one or more tier attribute values associated with the one or more tiers.

* * * * *